US011373464B2

(12) United States Patent
Ogawa et al.

(10) Patent No.: US 11,373,464 B2
(45) Date of Patent: Jun. 28, 2022

(54) VEHICLE-MOUNTED COMMUNICATIONS DEVICE, LOG COLLECTION METHOD, AND LOG COLLECTION PROGRAM

(71) Applicants: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihiro Ogawa, Osaka (JP); Hirofumi Urayama, Osaka (JP); Takeshi Hagihara, Yokkaichi (JP); Yasuhiro Yabuuchi, Yokkaichi (JP)

(73) Assignees: SUMITOMO ELECTRIC INDUSTRIES, LTD., Osaka (JP); AUTONETWORKS TECHNOLOGIES, LTD., Mie (JP); SUMITOMO WIRING SYSTEMS, LTD., Mie (JP)

( * ) Notice: Subject to any disclaimer, the term of this patent is extended or adjusted under 35 U.S.C. 154(b) by 252 days.

(21) Appl. No.: 16/629,996

(22) PCT Filed: Jun. 12, 2018

(86) PCT No.: PCT/JP2018/022352
§ 371 (c)(1),
(2) Date: Jan. 10, 2020

(87) PCT Pub. No.: WO2019/012890
PCT Pub. Date: Jan. 17, 2019

(65) Prior Publication Data
US 2020/0134937 A1 Apr. 30, 2020

(30) Foreign Application Priority Data
Jul. 10, 2017 (JP) .............................. JP2017-134273

(51) Int. Cl.
*G07C 5/00* (2006.01)
*B60R 16/023* (2006.01)
(Continued)

(52) U.S. Cl.
CPC .......... *G07C 5/008* (2013.01); *B60R 16/0231* (2013.01); *G07C 5/02* (2013.01); *H04W 4/44* (2018.02)

(58) Field of Classification Search
USPC ....................................................... 701/33.4
See application file for complete search history.

(56) References Cited

U.S. PATENT DOCUMENTS

2011/0006886 A1* 1/2011 Park ......................... H04Q 9/00
340/10.5
2012/0239246 A1* 9/2012 Tanaka .................. B60W 50/04
701/33.4
(Continued)

FOREIGN PATENT DOCUMENTS

| JP | 2012-210918 A | 11/2012 |
| JP | 2013-168865 A | 8/2013 |
| JP | 2014-203397 A | 10/2014 |

OTHER PUBLICATIONS

Sep. 11, 2018 International Search Report issued in International Patent Application No. PCT/JP2018/022352.

*Primary Examiner* — Tyler D Paige
(74) *Attorney, Agent, or Firm* — Oliff PLC

(57) ABSTRACT

An on-vehicle communication device capable of relaying data between a plurality of function units mounted on a vehicle includes: a log notification acquisition unit configured to receive, from an external device outside the vehicle, a log notification indicating a log target function unit which is the function unit that is a target of log collection, a start condition for log collection, and a trigger function unit which is the function unit capable of determination for the (Continued)

start condition; a notification unit configured to notify the trigger function unit of the start condition indicated by the log notification; and a command unit configured to give a command for log collection to the log target function unit, in response to a notification that the start condition is satisfied from the trigger function unit.

10 Claims, 15 Drawing Sheets

(51) Int. Cl.
*H04W 4/44* (2018.01)
*G06F 11/30* (2006.01)
*H04L 12/28* (2006.01)
*G07C 5/02* (2006.01)

(56) References Cited

U.S. PATENT DOCUMENTS

| | | | |
|---|---|---|---|
| 2014/0002651 A1* | 1/2014 | Plante | G08G 1/20 |
| | | | 348/148 |
| 2014/0277925 A1 | 9/2014 | Tanaka et al. | |
| 2016/0041014 A1* | 2/2016 | Sameshima | G01D 3/10 |
| | | | 702/127 |
| 2016/0086391 A1* | 3/2016 | Ricci | G06Q 10/10 |
| | | | 701/29.3 |
| 2016/0173530 A1* | 6/2016 | Miyake | H04L 67/12 |
| | | | 726/3 |
| 2016/0318522 A1 | 11/2016 | Tanaka et al. | |
| 2018/0060008 A1* | 3/2018 | Bender | G06F 3/147 |

\* cited by examiner

VEHICLE-MOUNTED COMMUNICATIONS DEVICE, LOG COLLECTION METHOD, AND LOG COLLECTION PROGRAM

TECHNICAL FIELD

The present invention relates to an on-vehicle communication device, a log collection method, and a log collection program.

This application claims priority on Japanese Patent Application No. 2017-134273 filed on Jul. 10, 2017, the entire contents of which are incorporated herein by reference.

BACKGROUND ART

PATENT LITERATURE 1 (Japanese Laid-Open Patent Publication No. 2013-168865) discloses an on-vehicle network system as follows. That is, the on-vehicle network system includes: an on-vehicle control device having a memory that stores therein definition data defining a part, of a communication protocol used in an on-vehicle network, which depends on implementation on the on-vehicle network; and a communication protocol issuing device that issues the definition data to the on-vehicle control device. When the communication protocol issuing device receives, from a registration device that allows the on-vehicle control device to participate in the on-vehicle network, a registration request that requests participation of the on-vehicle control device in the on-vehicle network, the communication protocol issuing device performs authentication for the registration device, creates the definition data based on implementation on the on-vehicle network, and returns the definition data to the registration device. The registration device receives the definition data transmitted from the communication protocol issuing device, and requests the on-vehicle control device to store the received definition data in the memory. Then, the on-vehicle control device receives the definition data from the registration device, stores the definition data in the memory, and performs communication by using the on-vehicle network, based on the part, of the communication protocol, defined by the definition data.

CITATION LIST

Patent Literature

PATENT LITERATURE 1: Japanese Laid-Open Patent Publication No. 2013-168865
PATENT LITERATURE 2: Japanese Laid-Open Patent Publication No. 2012-210918

SUMMARY OF INVENTION (1) An on-vehicle communication device of the present disclosure is an on-vehicle communication device capable of relaying data between a plurality of function units mounted on a vehicle, the on-vehicle communication device including: a log notification acquisition unit configured to receive, from an external device outside the vehicle, a log notification indicating a log target function unit which is the function unit that is a target of log collection, a start condition for log collection, and a trigger function unit which is the function unit capable of determination for the start condition; a notification unit configured to notify the trigger function unit of the start condition indicated by the log notification; and a command unit configured to give a command for log collection to the log target function unit, in response to a notification that the start condition is satisfied from the trigger function unit.

(5) A log collection method of the present disclosure is a log collection method in an on-vehicle communication device capable of relaying data between a plurality of function units mounted on a vehicle, the log collection method including the steps of: receiving, from an external device outside the vehicle, a log notification indicating a log target function unit which is the function unit that is a target of log collection, a start condition for log collection, and a trigger function unit which is the function unit capable of determination for the start condition; notifying the trigger function unit of the start condition indicated by the log notification; and giving a command for log collection to the log target function unit, in response to a notification that the start condition is satisfied from the trigger function unit.

(6) A log collection program of the present disclosure is a log collection program used in an on-vehicle communication device capable of relaying data between a plurality of function units mounted on a vehicle, the log collection program causing a computer to function as: a log notification acquisition unit configured to receive, from an external device outside the vehicle, a log notification indicating a log target function unit which is the function unit that is a target of log collection, a start condition for log collection, and a trigger function unit which is the function unit capable of determination for the start condition; a notification unit configured to notify the trigger function unit of the start condition indicated by the log notification; and a command unit configured to give a command for log collection to the log target function unit, in response to a notification that the start condition is satisfied from the trigger function unit.

One mode of the present disclosure can be realized not only as an on-vehicle communication device including such a characteristic processing unit but also as an on-vehicle communication system including such an on-vehicle communication device. Further, one mode of the present disclosure can be realized as a semiconductor integrated circuit that realizes a part or the entirety of the on-vehicle communication device.

DESCRIPTION OF EMBODIMENTS

Figure 1:
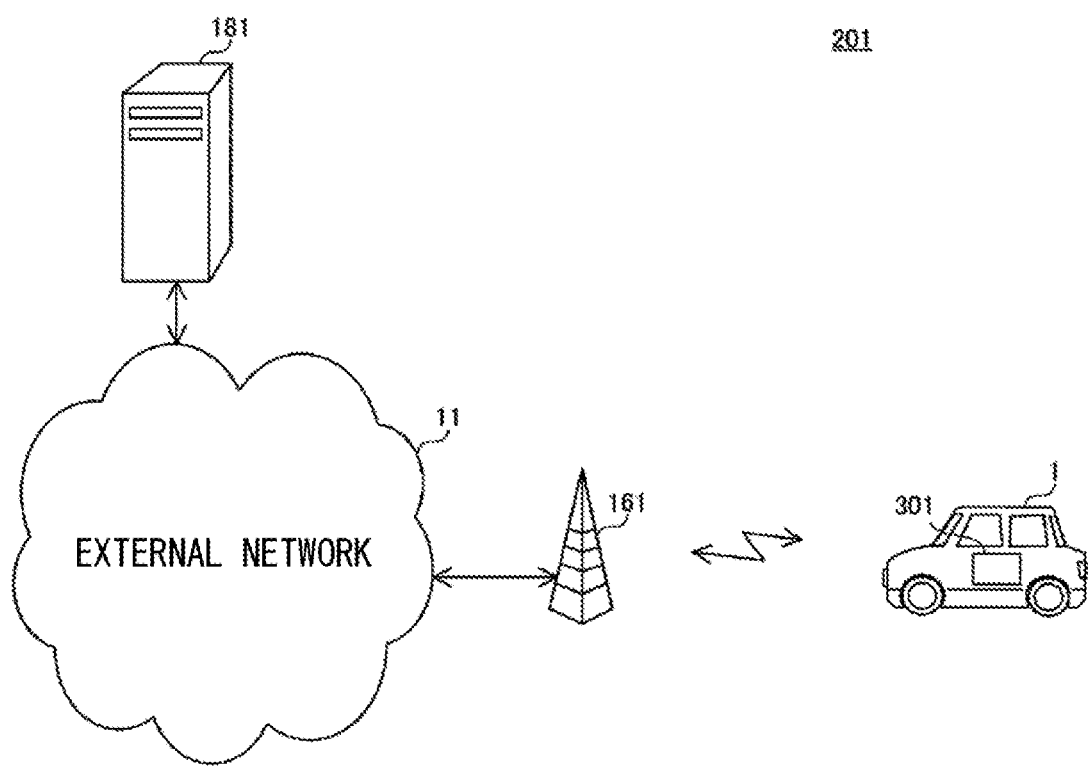
FIG. 1 is a diagram showing the configuration of a communication system according to an embodiment of the present disclosure.

Conventionally, an on-vehicle network system for improving security in an on-vehicle network is being developed.

Problems to be Solved by the Present Disclosure

The on-vehicle control device in the on-vehicle network described in PATENT LITERATURE 1 performs, for example, measurement of the environment and the state of a vehicle, control for components constituting the vehicle, and the like.

It is preferable that a result of the measurement and a result of the control by the on-vehicle control device are recorded as logs because they are useful for vehicle development or the like. However, if all the information is recorded as logs, the data amount becomes enormous. Technology for efficiently collecting logs is required.

The present disclosure has been made to solve the above problem, and an object of the present disclosure is to provide an on-vehicle communication device, a log collection method, and a log collection program that are capable of efficiently collecting logs in an on-vehicle network.

Effects of the Present Disclosure

According to the present disclosure, it is possible to efficiently collect logs in an on-vehicle network.

Description of Embodiment of the Present Disclosure

First, contents of embodiments of the present disclosure are listed and described.

(1) An on-vehicle communication device according to the embodiment of the present disclosure is an on-vehicle communication device capable of relaying data between a plurality of function units mounted on a vehicle, the on-vehicle communication device including: a log notification acquisition unit configured to receive, from an external device outside the vehicle, a log notification indicating a log target function unit which is the function unit that is a target of log collection, a start condition for log collection, and a trigger function unit which is the function unit capable of determination for the start condition; a notification unit configured to notify the trigger function unit of the start condition indicated by the log notification; and a command unit configured to give a command for log collection to the log target function unit, in response to a notification that the start condition is satisfied from the trigger function unit.

With this configuration, for example, by setting a log notification for collecting logs useful for vehicle development in an external device as appropriate, log collection only for such useful logs can be performed. Therefore, logs can be efficiently collected in the on-vehicle network. Thus, it is possible to utilize, for vehicle development, the learned contents about results of measurements of the environment and the state of the vehicle and a result of control for components constituting the vehicle, for example.

(2) Preferably, the log notification indicates a plurality of the start conditions associated with one said trigger function unit.

With this configuration, for example, it is possible to efficiently collect logs classified for each vehicle state or each vehicle environment.

(3) Preferably, the log notification indicates a plurality of the trigger function units and a set of a plurality of the start conditions respectively associated with the plurality of trigger function units, and the command unit gives the command when the plurality of start conditions are all satisfied.

With this configuration, for example, logs in a specific vehicle state and a specific vehicle environment, which are required for vehicle development, can be collected in a specified manner.

(4) More preferably, the log notification indicates a plurality of the sets, and the command unit gives the command when the plurality of start conditions in any one of the plurality of sets are all satisfied.

With this configuration, for example, it is possible to efficiently collect logs classified for each specific vehicle state and each specific vehicle environment, which are required for vehicle development.

(5) A log collection method according to the embodiment of the present disclosure is a log collection method in an on-vehicle communication device capable of relaying data between a plurality of function units mounted on a vehicle, the log collection method including the steps of: receiving, from an external device outside the vehicle, a log notification indicating a log target function unit which is the function unit that is a target of log collection, a start condition for log collection, and a trigger function unit which is the function unit capable of determination for the start condition; notifying the trigger function unit of the start condition indicated by the log notification; and giving a command for log collection to the log target function unit, in response to a notification that the start condition is satisfied from the trigger function unit.

With this configuration, for example, by setting a log notification for collecting logs useful for vehicle development in an external device as appropriate, log collection only for such useful logs can be performed. Therefore, logs can be efficiently collected in the on-vehicle network. Thus, it is possible to utilize, for vehicle development, the learned contents about results of measurements of the environment and the state of the vehicle and a result of control for components constituting the vehicle, for example.

(6) A log collection program according to the embodiment of the present disclosure is a log collection program used in an on-vehicle communication device capable of relaying data between a plurality of function units mounted on a vehicle, the log collection program causing a computer to function as: a log notification acquisition unit configured to receive, from an external device outside the vehicle, a log notification indicating a log target function unit which is the function unit that is a target of log collection, a start condition for log collection, and a trigger function unit which is the function unit capable of determination for the start condition; a notification unit configured to notify the trigger function unit of the start condition indicated by the log notification; and a command unit configured to give a command for log collection to the log target function unit, in response to a notification that the start condition is satisfied from the trigger function unit.

With this configuration, for example, by setting a log notification for collecting logs useful for vehicle development in an external device as appropriate, log collection only for such useful logs can be performed. Therefore, logs can be efficiently collected in the on-vehicle network. Thus, it is possible to utilize, for vehicle development, the learned contents about results of measurements of the environment and the state of the vehicle and a result of control for components constituting the vehicle, for example.

Hereinafter, embodiments of the present disclosure will be described with reference to the drawings. In the drawings, the same or corresponding parts are denoted by the same reference characters, and description thereof is not repeated. At least some parts of the embodiments described below may be combined together as desired.

[Configuration and Basic Operation]

FIG. 1 is a diagram showing the configuration of a communication system according to the embodiment of the present disclosure.

With reference to FIG. 1, a communication system 201 includes a server 181 and an on-vehicle communication system 301. The on-vehicle communication system 301 is mounted on the vehicle 1.

The communication system 201 is not limited to a configuration including one pair of the vehicle 1 and the on-vehicle communication system 301, but may have a configuration including plural pairs of the vehicles 1 and the on-vehicle communication systems 301.

Figure 2:
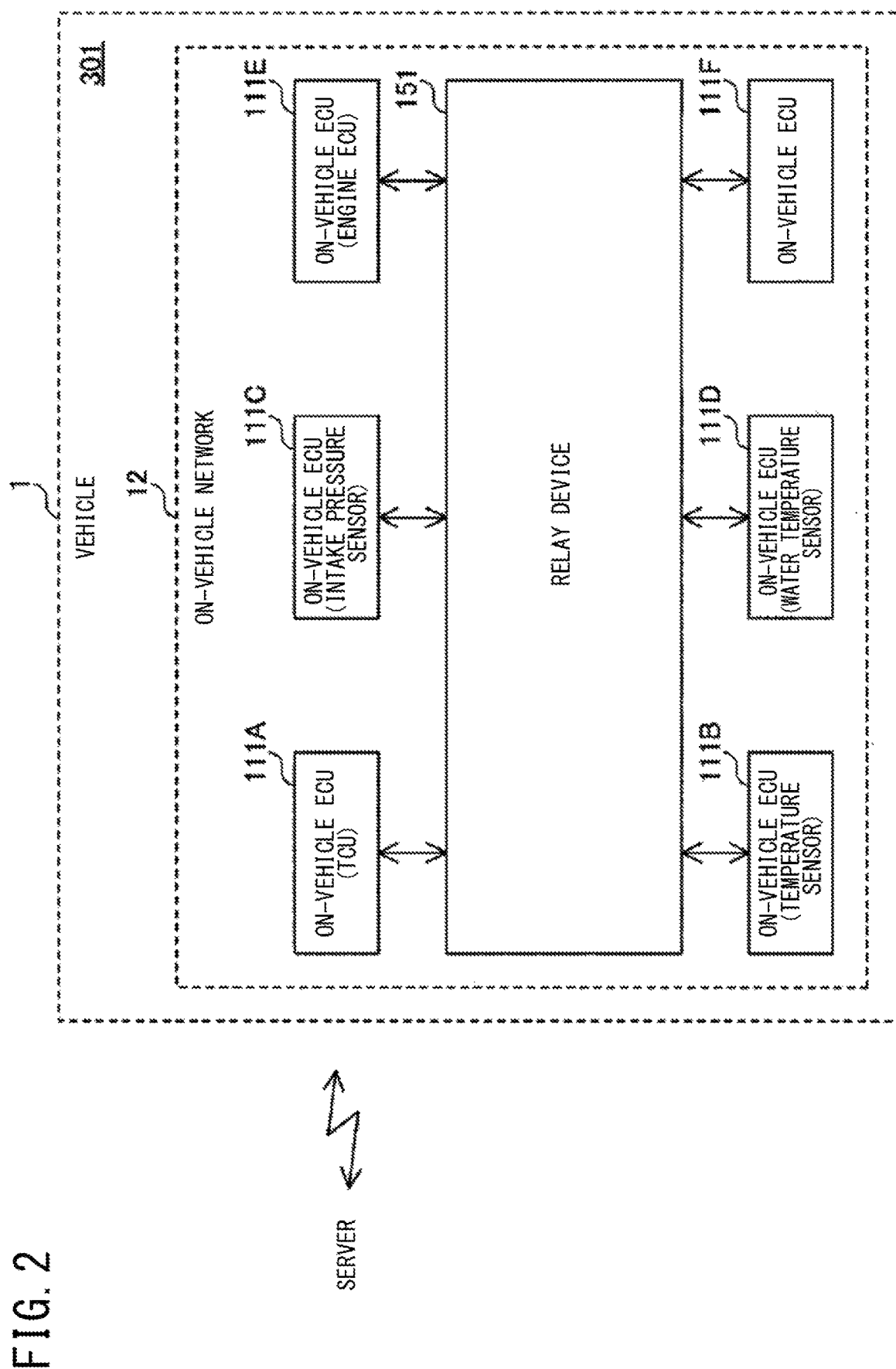
FIG. 2 is a diagram showing the configuration of an on-vehicle communication system according to the embodiment of the present disclosure.

FIG. 2 is a diagram showing the configuration of the on-vehicle communication system according to the embodiment of the present disclosure.

With reference to FIG. 2, the on-vehicle communication system 301 includes on-vehicle electronic control units (ECUs) 111A to 111F and a relay device (on-vehicle communication device) 151.

Hereinafter, each of the on-vehicle ECUs 111A to 111F may be referred to as on-vehicle ECU 111. In addition, the on-vehicle ECU 111 is an example of a function unit.

The on-vehicle communication system 301 is not limited to a configuration including six on-vehicle ECUs 111, but may have a configuration including two, three, four, five, seven, or more on-vehicle ECUs 111. The on-vehicle communication system 301 is not limited to a configuration including one relay device 151, but may have a configuration including a plurality of relay devices 151.

Examples of the on-vehicles ECU 111 include a telematics communication unit (TCU), an autonomous driving electronic control unit (ECU), an engine ECU, a sensor, a navigation device, a human machine interface, and a camera.

In this example, the on-vehicle ECUs 111A, 111B, 111C, 111D, 111E are a TCU, a temperature sensor, an intake pressure sensor, a water temperature sensor, and an engine ECU, respectively.

Hereinafter, the on-vehicle ECUs 111A, 111B, 111C, 111D, 111E may be referred to as TCU 111A, temperature sensor 111B, intake pressure sensor 111C, water temperature sensor 111D, and engine ECU 111E, respectively.

In the on-vehicle network 12, the on-vehicle ECUs 111A to 111F are each connected to the relay device 151 via an Ethernet (registered trademark) cable.

The relay device 151 is, for example, a gateway device, and is capable of relaying data between a plurality of function units mounted on the vehicle 1.

The relay device 151 performs relay processing for an Ethernet frame in accordance with a communication standard of Ethernet.

Specifically, the relay device 151 relays an Ethernet frame that is sent/received between the on-vehicle ECUs 111. An IP packet is stored in the Ethernet frame.

The on-vehicle communication system 301 is not limited to a configuration of performing relay of an Ethernet frame in accordance with the communication standard of Ethernet. For example, the on-vehicle communication system 301 may perform data relay in accordance with a communication standard such as controller area network (CAN) (registered trademark), FlexRay (registered trademark), media oriented systems transport (MOST) (registered trademark), or local interconnect network (LIN).

The temperature sensor 111B is capable of communicating with another on-vehicle ECU 111 via the relay device 151, and, for example, regularly measures the ambient temperature of the vehicle 1.

The intake pressure sensor 111C is capable of communicating with another on-vehicle ECU 111 via the relay device 151, and, for example, regularly measures the intake pressure of the engine in the vehicle 1.

The water temperature sensor 111D is capable of communicating with another on-vehicle ECU 111 via the relay device 151, and, for example, regularly measures the temperature of cooling water circulating inside the engine in the vehicle 1.

The engine ECU 111E is capable of communicating with another on-vehicle ECU 111 via the relay device 151, and, for example, controls the engine in the vehicle 1.

More specifically, for example, the engine ECU 111E acquires information indicating the rotation speed of the engine, the vehicle speed of the vehicle 1, the brake torque of the engine, the state of the transmission, the state of a throttle valve, measurement values of the sensors, and the like, and controls the engine on the basis of the acquired information.

In addition, the engine ECU 111E is capable of transmitting some or all of the acquired information to the relay device 151 in accordance with a request from the relay device 151, for example.

With reference to FIG. 1 and FIG. 2, the TCU 111A is capable of communicating with the server 181. Specifically, the TCU 111A is capable of communicating with the server 181 via a wireless base station device 161 in accordance with the IP protocol, for example.

More specifically, the TCU 111A is capable of performing wireless communication with the wireless base station device 161 in accordance with a communication standard such as Long Term Evolution (LTE) or 3G, for example.

Specifically, when the TCU 111A has received a wireless frame in which an IP packet from the server 181 is stored from the wireless base station device 161, the TCU 111A acquires the IP packet from the received wireless frame, stores the acquired IP packet in an Ethernet frame, and then transmits the Ethernet frame to the relay device 151.

When the TCU 111A has received an Ethernet frame from the relay device 151, the TCU 111A acquires an IP packet from the received Ethernet frame, stores the acquired IP packet in a wireless frame, and transmits the wireless frame to the wireless base station device 161.

When the wireless base station device 161 has received the wireless frame from the TCU 111A, the wireless base station device 161 acquires the IP packet from the received wireless frame and transmits the acquired IP packet to the server 181 via an external network 11.

When the wireless base station device 161 has received an IP packet from the server 181 via the external network 11, the wireless base station device 161 stores the received IP packet in a wireless frame and transmits the wireless frame to the TCU 111A.

Figure 3:
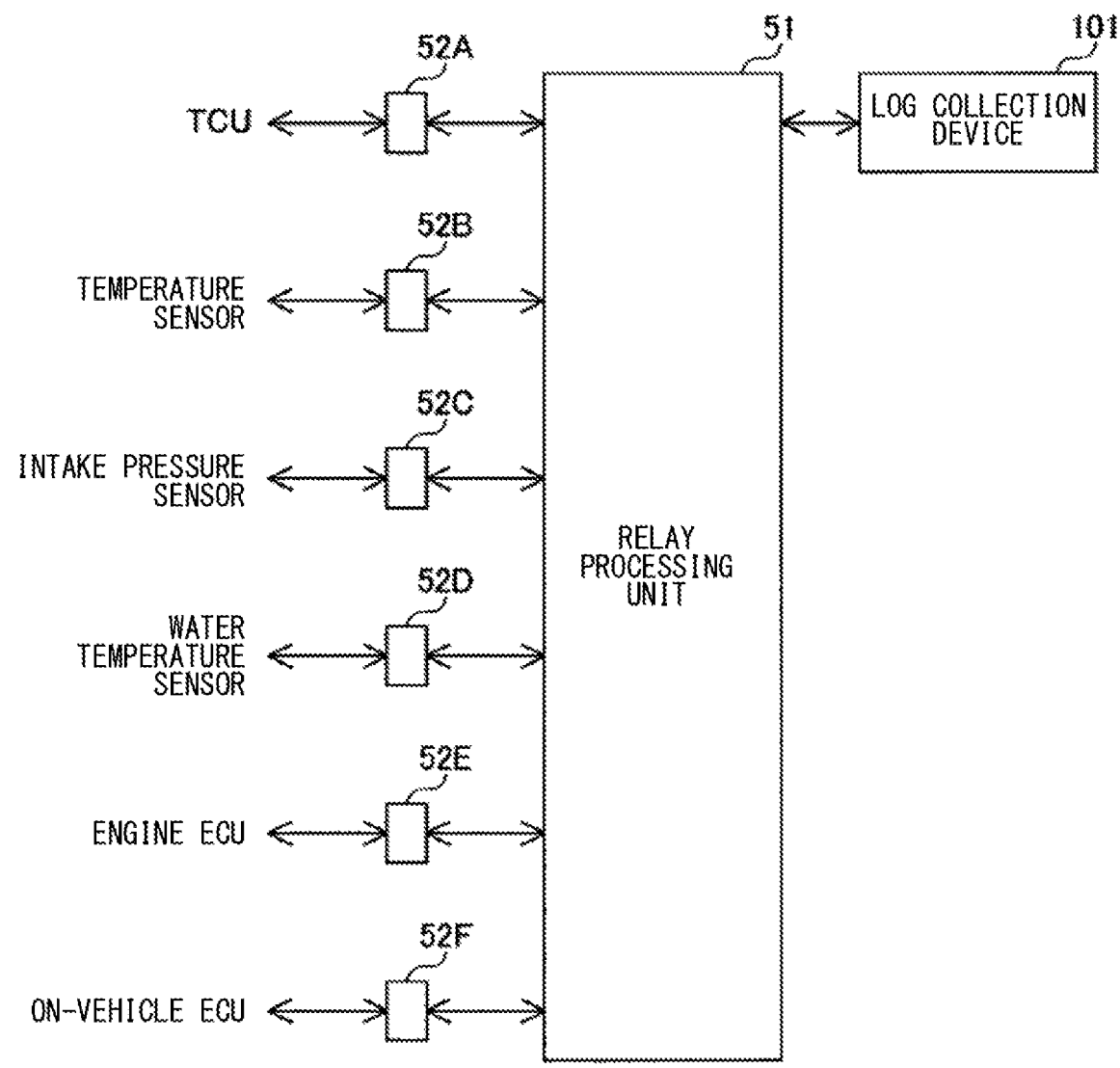
FIG. 3 is a diagram showing the configuration of a relay device in the on-vehicle communication system according to the embodiment of the present disclosure.

FIG. 3 is a diagram showing the configuration of the relay device in the on-vehicle communication system according to the embodiment of the present disclosure.

With reference to FIG. 3, the relay device 151 includes a relay processing unit 51, communication ports 52A, 52B, 52C, 52D, 52E, 52F, and a log collection device 101.

Hereinafter, each of the communication ports 52A, 52B, 52C, 52D, 52E, 52F may be referred to as communication port 52. The communication port 52 is, for example, a terminal connectable with an Ethernet cable.

In this example, the communication ports 52A, 52B, 52C, 52D, 52E, 52F are connected to the TCU 111A, the temperature sensor 111B, the intake pressure sensor 111C, the water temperature sensor 111D, the engine ECU 111E, and the on-vehicle ECU 111F, respectively.

The relay processing unit 51 performs relay processing of an Ethernet frame. Specifically, for example, when the relay processing unit 51 has received an Ethernet frame via the communication port 52, the relay processing unit 51 performs layer-2 switch processing and layer-3 relay processing for the received Ethernet frame.

Then, the relay processing unit 51 transmits, via another communication port 52, the Ethernet frame that has undergone the switch processing and the relay processing.

Figure 4:
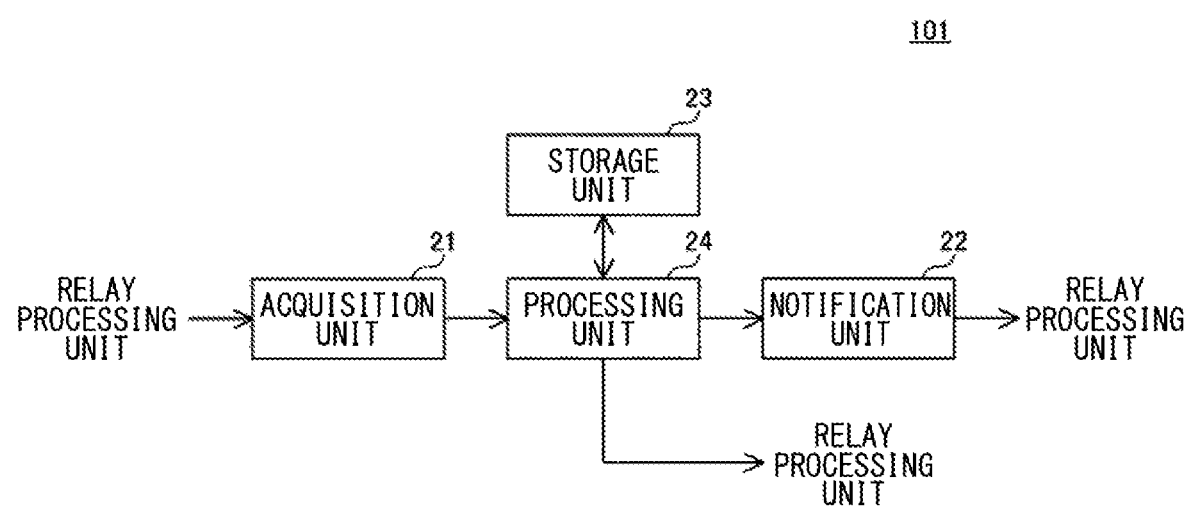
FIG. 4 is a diagram showing the configuration of a log collection device in the on-vehicle communication system according to the embodiment of the present disclosure.

FIG. 4 is a diagram showing the configuration of the log collection device in the on-vehicle communication system according to the embodiment of the present disclosure.

With reference to FIG. 4, the log collection device 101 includes an acquisition unit 21, a notification unit 22, a storage unit 23, and a processing unit (command unit) 24.

[Flow of Operation]

Each device in the communication system 201 includes a computer, and a calculation processing unit such as a CPU in the computer reads a program including some or all of steps in the following sequence chart or flowchart from a memory (not shown), and executes the program. The programs for the plurality of devices can be each installed from outside. The programs for the plurality of devices are each distributed in a state of being stored in a storage medium.

Figure 5:
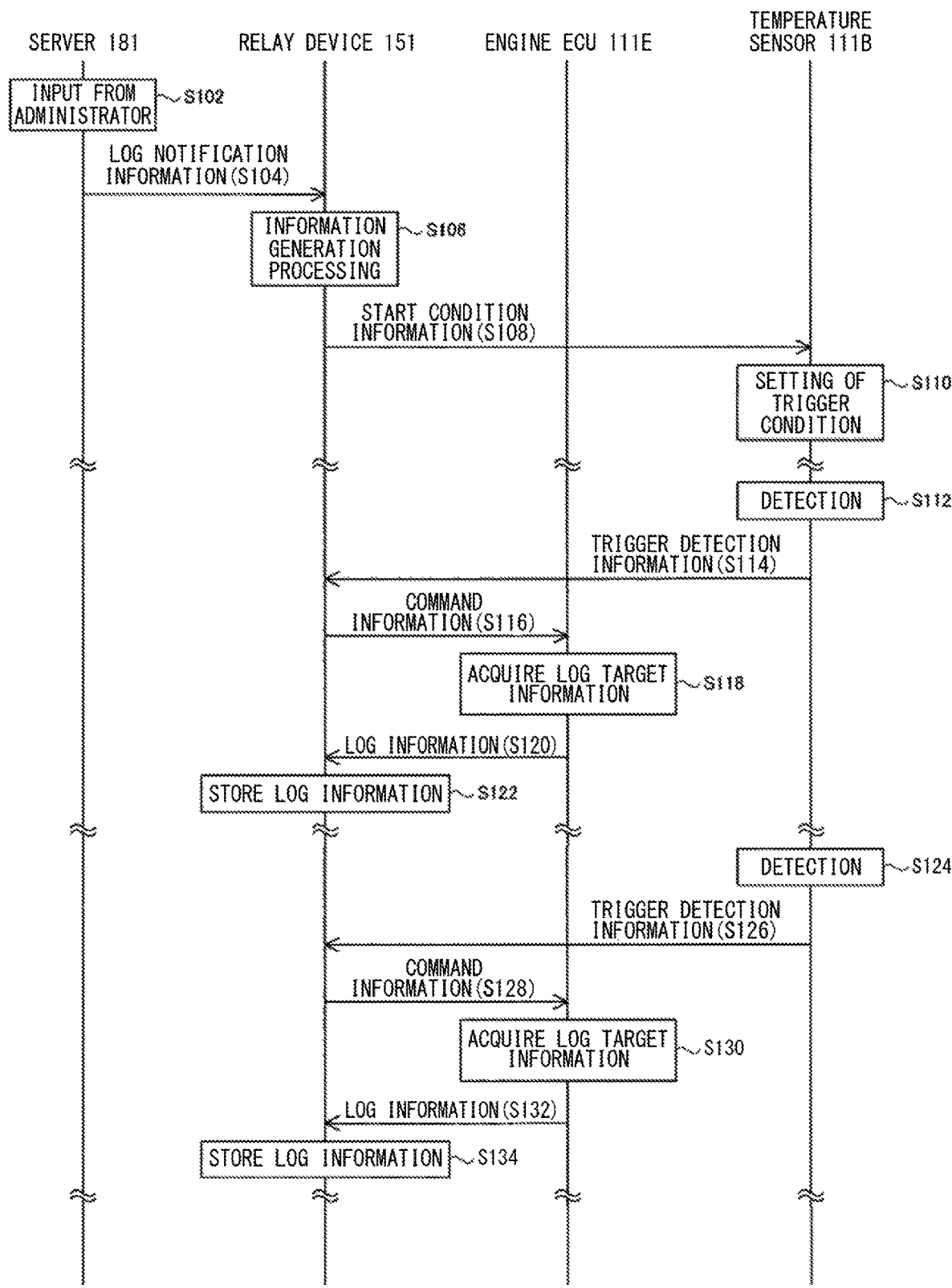
FIG. 5 is a chart showing an example of a sequence in a case where the relay device has received log notification information in the communication system according to the embodiment of the present disclosure.
Figure 6:
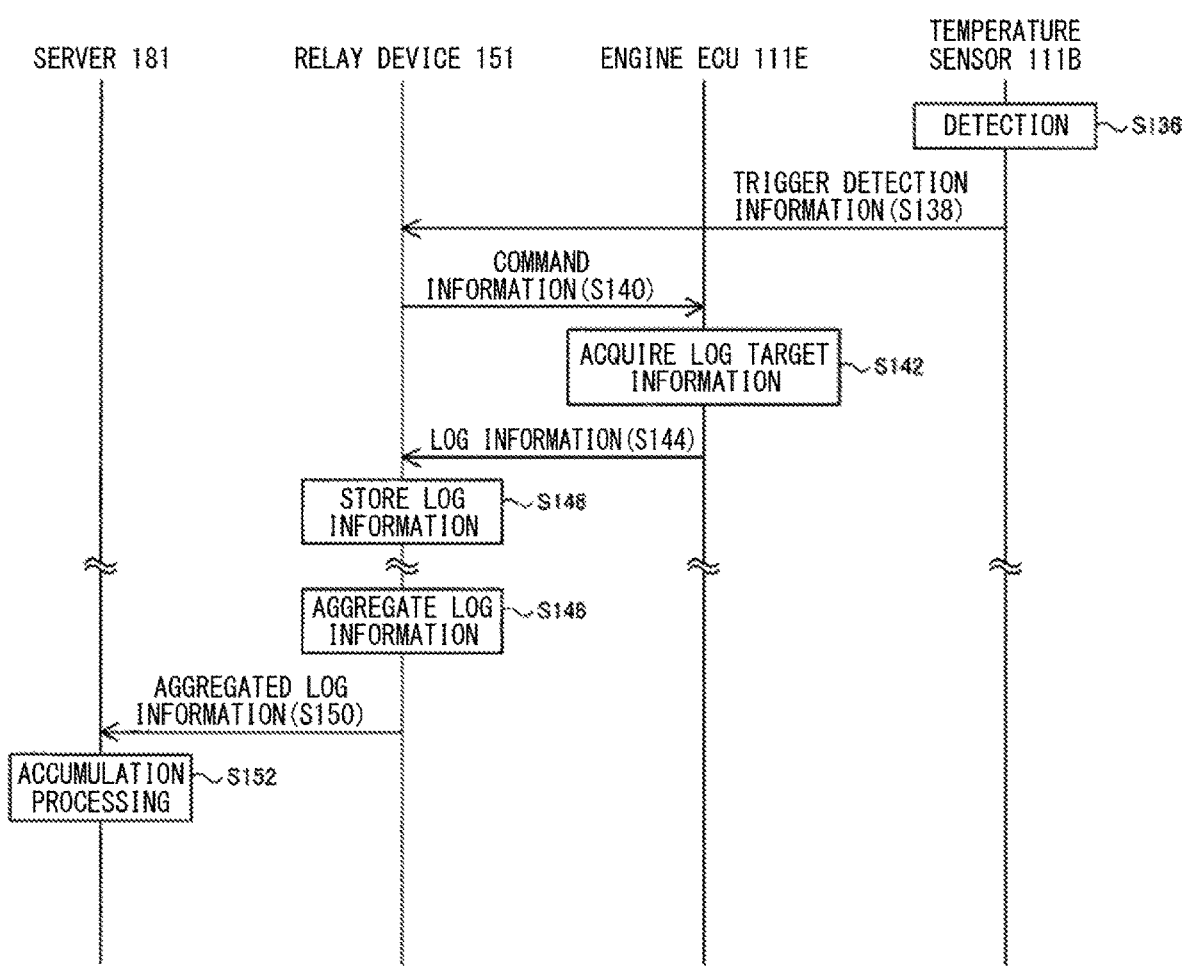
FIG. 6 is a chart showing the example of the sequence in the case where the relay device has received log notification information in the communication system according to the embodiment of the present disclosure.

FIG. 5 and FIG. 6 are charts showing an example of a sequence in a case where the relay device has received log notification information in the communication system according to the embodiment of the present disclosure. FIG. 6 shows continuation from the sequence shown in FIG. 5.

With reference to FIG. 3 to FIG. 6, first, an administrator inputs, to the server 181, a command for performing, in the vehicle 1, log collection for the correspondence relationship between the engine rotation speed and the brake torque when the ambient temperature around the vehicle 1 is 5° C., 10° C. and 15° C., for example (step S102).

Next, in response to the input from the administrator, the server 181 generates log notification information corresponding to a log notification, and transmits the generated log notification information to the relay device 151 in the vehicle 1 (step S104).

More specifically, for example, the server 181 manages the configuration of the on-vehicle network 12 in the vehicle 1, and generates the log notification information on the basis of the management content and the input content from the administrator.

Here, the log notification information indicates the type of log target information, a log target function unit which is a function unit that is a target of log collection, a start condition for log collection, and a trigger function unit which is a function unit capable of determination for the start condition.

More specifically, the log notification information indicates a plurality of start conditions associated with one trigger function unit, for example.

Specifically, the log notification information indicates, for example, an engine rotation speed and a brake torque as types of log target information, the address (hereinafter, may be referred to as log address) of the engine ECU 111E as the log target function unit, ambient temperatures of 5° C., 10° C. and 15° C. as the start conditions, and the address (hereinafter, may be referred to as first trigger address) of the temperature sensor 111B as the trigger function unit.

The log address and the first trigger address are, for example, internet protocol (IP) addresses. The log address and the first trigger address may be media access control (MAC) addresses.

Instead of the log address, the port number of the communication port 52 to which the log target function unit is connected in the relay device 151 may be used. Instead of the first trigger address, the port number of the communication port 52 to which the trigger function unit is connected in the relay device 151 may be used.

Next, when the relay device 151 has received the log notification information from the server 181, the relay device 151 generates start condition information and command information on the basis of the received log notification information (step S106).

More specifically, when the relay processing unit 51 in the relay device 151 has received the log notification information from the server 181 via the TCU 111A, the relay processing unit 51 outputs the received log notification information to the log collection device 101.

The acquisition unit 21 in the log collection device 101 receives the log notification information from an external device outside the vehicle 1, here, from the server 181.

More specifically, when the acquisition unit 21 has received the log notification information from the relay processing unit 51, the acquisition unit 21 outputs the received log notification information to the processing unit 24.

When the processing unit 24 has received the log notification information from the acquisition unit 21, the processing unit 24 acquires the engine rotation speed and the brake torque as types of log target information, the log address, the start conditions, and the first trigger address from the received log notification information, and generates start condition information including ambient temperatures of 5° C., 10° C., and 15° C. as the start conditions, with the acquired first trigger address set as the destination address.

In addition, the processing unit 24 generates command information including the engine rotation speed and the brake torque as types of log target information, with the acquired log address set as the destination address.

Next, the relay device 151 transmits the generated start condition information to the temperature sensor 111B (step S108).

More specifically, the processing unit 24 in the log collection device 101 outputs the generated start condition information to the notification unit 22.

The notification unit 22 notifies the trigger function unit of the start conditions indicated by the log notification information. Specifically, when the notification unit 22 has received the start condition information from the processing unit 24, the notification unit 22 outputs the received start condition information to the relay processing unit 51.

When the relay processing unit 51 has received the start condition information from the notification unit 22, the relay processing unit 51 transmits the start condition information to the temperature sensor 111B via the communication port 52B, using the first trigger address which is the destination address of the received start condition information.

Next, when the temperature sensor 111B has received the start condition information from the relay device 151, the temperature sensor 111B sets the start conditions included in the received start condition information, i.e., ambient temperatures of 5° C., 10° C., and 15° C., as trigger conditions (step S110).

Next, for example, the temperature sensor 111B measures the ambient temperature of 5° C. and thus detects that the trigger condition for 5° C. is satisfied (step S112).

Next, the temperature sensor 111B transmits trigger detection information indicating that the trigger condition for 5° C. is satisfied, to the relay device 151 (step S114).

Next, when the relay device 151 has received the trigger detection information from the temperature sensor 111B, the relay device 151 transmits command information to the engine ECU 111E (step S116).

More specifically, when the relay processing unit 51 in the relay device 151 has received the trigger detection information from the temperature sensor 111B, the relay processing unit 51 outputs the received trigger detection information to the log collection device 101.

When the acquisition unit 21 in the log collection device 101 has received the trigger detection information from the relay processing unit 51, the acquisition unit 21 outputs the received trigger detection information to the processing unit 24.

In response to the notification that the start condition is satisfied from the trigger function unit, the processing unit 24 gives a command for log collection to the log target function unit.

More specifically, when the processing unit 24 has received the trigger detection information from the acquisition unit 21, the processing unit 24 recognizes that the ambient temperature of 5° C. has been measured by the temperature sensor 111B, on the basis of the received trigger detection information, and outputs the already generated command information to the relay processing unit 51.

When the relay processing unit 51 has received the command information from the processing unit 24, the relay processing unit 51 transmits the command information to the engine ECU 111E via the communication port 52E, using the log address which is the destination address of the received command information.

Next, when the engine ECU 111E has received the command information from the relay device 151, the engine ECU 111E acquires, in accordance with the received command information, the log target information included in the command information (step S118).

More specifically, the engine ECU 111E acquires each of information indicating the engine rotation speed and information indicating the brake torque, for one point.

Next, the engine ECU 111E transmits log information including the acquired information to the relay device 151 (step S120).

Next, when the relay device 151 has received the log information from the engine ECU 111E, the relay device 151 stores the received log information (step S122).

More specifically, when the relay processing unit 51 in the relay device 151 has received the log information from the engine ECU 111E, the relay processing unit 51 outputs the received log information to the log collection device 101.

When the acquisition unit 21 in the log collection device 101 has received the log information from the relay processing unit 51, the acquisition unit 21 outputs the received log information to the processing unit 24.

When the processing unit 24 has received the log information from the acquisition unit 21, the processing unit 24 incorporates 5° C. included in the trigger detection information, into the received log information. Then, the processing unit 24 stores the log information into the storage unit 23.

Here, the above operation from step S112 to step S122 is repeated every time the trigger condition for 5° C. is satisfied in the temperature sensor 111B, for example.

Next, for example, the temperature sensor 111B measures the ambient temperature of 10° C., and thus detects that the trigger condition for 10° C. is satisfied (step S124).

Next, the temperature sensor 111B transmits trigger detection information indicating that the trigger condition for 10° C. is satisfied, to the relay device 151 (step S126).

Next, when the relay device 151 has received the trigger detection information from the temperature sensor 111B, the relay device 151 transmits command information to the engine ECU 111E (step S128).

More specifically, when the processing unit 24 in the relay device 151 has received the trigger detection information from the temperature sensor 111B via the relay processing unit 51 and the acquisition unit 21, the processing unit 24 recognizes that the ambient temperature of 10° C. has been measured by the temperature sensor 111B, on the basis of the received trigger detection information, and transmits the already generated command information to the engine ECU 111E via the relay processing unit 51.

Next, when the engine ECU 111E has received the command information from the relay device 151, the engine ECU 111E acquires, in accordance with the received command information, the log target information included in the command information, i.e., each of information indicating the engine rotation speed and information indicating the brake torque, for one point (step S130).

Next, the engine ECU 111E transmits log information including the acquired information, to the relay device 151 (step S132).

Next, when the relay device 151 has received the log information from the engine ECU 111E, the relay device 151 stores the received log information (step S134).

More specifically, when the processing unit 24 in the relay device 151 has received the log information from the engine ECU 111E via the relay processing unit 51 and the acquisition unit 21, the processing unit 24 incorporates 10° C. included in the trigger detection information, into the received log information. Then, the processing unit 24 stores the log information into the storage unit 23.

Here, the above operation from step S124 to step S134 is repeated every time the trigger condition for 10° C. is satisfied in the temperature sensor 111B, for example.

Next, for example, the temperature sensor 111B measures the ambient temperature of 15° C., and thus detects that the trigger condition for 15° C. is satisfied (step S136).

Next, the temperature sensor 111B transmits trigger detection information indicating that the trigger condition for 15° C. is satisfied, to the relay device 151 (step S138).

Next, when the relay device 151 has received the trigger detection information from the temperature sensor 111B, the relay device 151 transmits command information to the engine ECU 111E (step S140).

More specifically, when the processing unit 24 in the relay device 151 has received the trigger detection information from the temperature sensor 111B via the relay processing unit 51 and the acquisition unit 21, the processing unit 24 recognizes that the ambient temperature for 15° C. has been measured by the temperature sensor 111B, on the basis of the received trigger detection information, and transmits the already generated command information to the engine ECU 111E via the relay processing unit 51.

Next, when the engine ECU 111E has received the command information from the relay device 151, the engine ECU 111E acquires, in accordance with the received command information, the log target information included in the command information, i.e., each of information indicating the engine rotation speed and information indicating the brake torque, for one point (step S142).

Next, the engine ECU 111E transmits log information including the acquired information to the relay device 151 (step S144).

Next, when the relay device 151 has received the log information from the engine ECU 111E, the relay device 151 stores the received log information (step S146).

More specifically, when the processing unit 24 in the relay device 151 has received the log information from the engine ECU 111E via the relay processing unit 51 and the acquisition unit 21, the processing unit 24 incorporates 15° C. included in the trigger detection information, into the received log information. Then, the processing unit 24 stores the log information into the storage unit 23.

Here, the above operation from step S136 to step S146 is repeated every time the trigger condition for 15° C. is satisfied in the temperature sensor 111B, for example.

Next, the relay device 151 aggregates the respective pieces of stored log information, thereby generating aggregated log information (step S148).

More specifically, for example, when the log information for a predetermined number of points is stored in the storage unit 23, the processing unit 24 in the relay device 151 aggregates the respective pieces of the log information stored in the storage unit 23, thereby generating aggregated log information.

Next, the processing unit 24 transmits the generated aggregated log information to the server 181 via the relay processing unit 51 and the TCU 111A (step S150).

Next, when the server 181 has received the aggregated log information from the relay device 151, the server 181 performs accumulation processing for accumulating the received aggregated log information (step S152).

In the above flow of operation, the start conditions are that the ambient temperature becomes specific values. However, the start conditions are not limited thereto. The start conditions may be that the ambient temperature becomes values within a specific range.

The order of steps S112 to S122, steps S124 to S134, and steps S136 to S146 is not limited to the above order. A part or the entirety of the order may be changed.

In the above steps S118, S130, S142, the engine ECU 111E acquires each of information indicating the engine rotation speed and information indicating the brake torque, for one point. However, the present disclosure is not limited thereto. For example, the engine ECU 111E may acquire information indicating the engine rotation speed for a plurality of points and information indicating the brake torque for a plurality of points, in a predetermined period.

In the above steps S122, S134, S146, the relay device 151 receives log information from the engine ECU 111E and stores the log information. However, the present disclosure is not limited thereto. While the engine ECU 111E stores log information, when log information for a predetermined number of points is stored in the engine ECU 111E, the relay device 151 may collectively acquire the log information stored in the engine ECU 111E.

Figure 7:
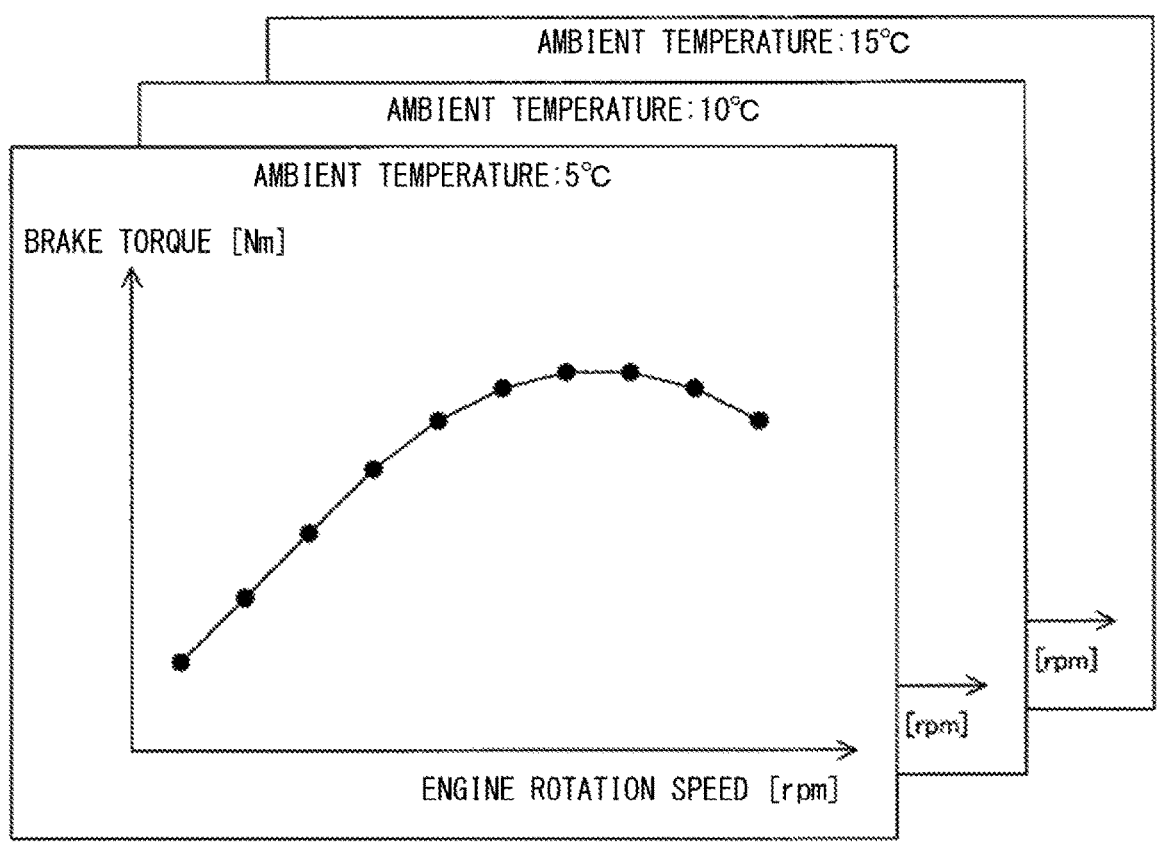
FIG. 7 shows an example of aggregated log information collected in the communication system according to the embodiment of the present disclosure.

FIG. 7 shows an example of the aggregated log information collected in the communication system according to the embodiment of the present disclosure. It is noted that, in FIG. 7, the horizontal axis indicates the engine rotation speed and the vertical axis indicates the brake torque.

With reference to FIG. 7, the aggregated log information including the correspondence relationship between the engine rotation speed and the brake torque when the ambient temperature is 5° C., 10° C., and 15° C., which is required by the administrator, is accumulated in the server 181.

The aggregated log information accumulated in the server 181 is fed back to the manufacturer for the vehicle 1, for example.

As shown in FIG. 7, for example, the manufacturer for the vehicle 1 plots, on a graph, a traveling performance curve for each of cases where the ambient temperature is 5° C., 10° C., and 15° C., using the aggregated log information.

Owing to the above configuration, the manufacturer for the vehicle 1 can acquire the traveling performance curve of the engine in each environmental condition, and thus, it is possible to appropriately adjust, for example, a setting value or the like in a control program for the engine in accordance with the environmental condition in which the vehicle 1 travels.

Modification 1 of Log Notification Information

In the above configuration, the log notification information indicates a plurality of start conditions associated with one trigger function unit. However, the log notification information is not limited thereto. The log notification information may indicate a plurality of trigger function units and a set of a plurality of start conditions respectively associated with the plurality of trigger function units.

In this case, the processing unit 24 in the log collection device 101 gives a command for log collection when the plurality of start conditions are all satisfied, for example.

Figure 8:
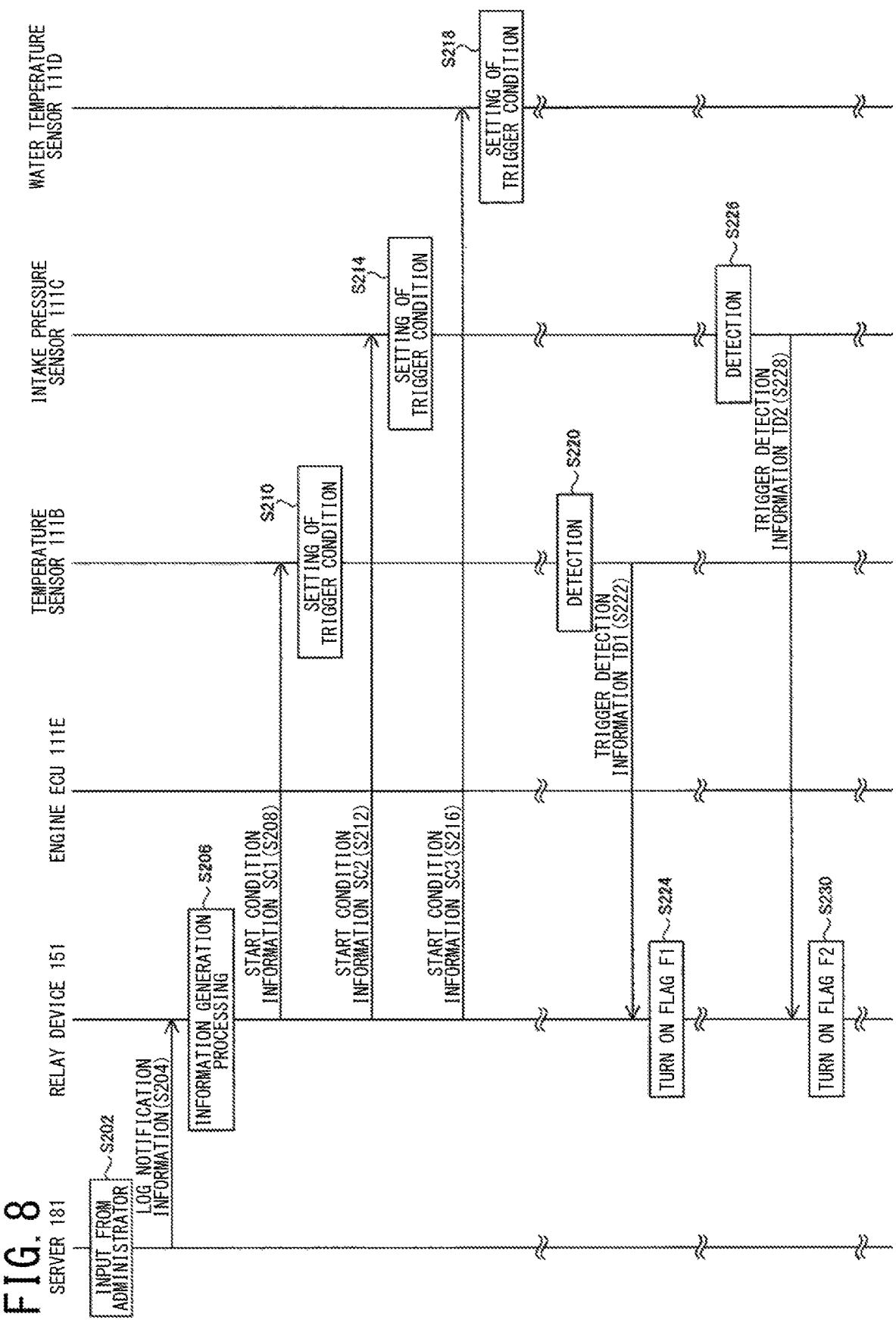
FIG. 8 is a chart showing an example of a sequence in a case where the relay device has received log notification information in the communication system according to the embodiment of the present disclosure.
Figure 9:
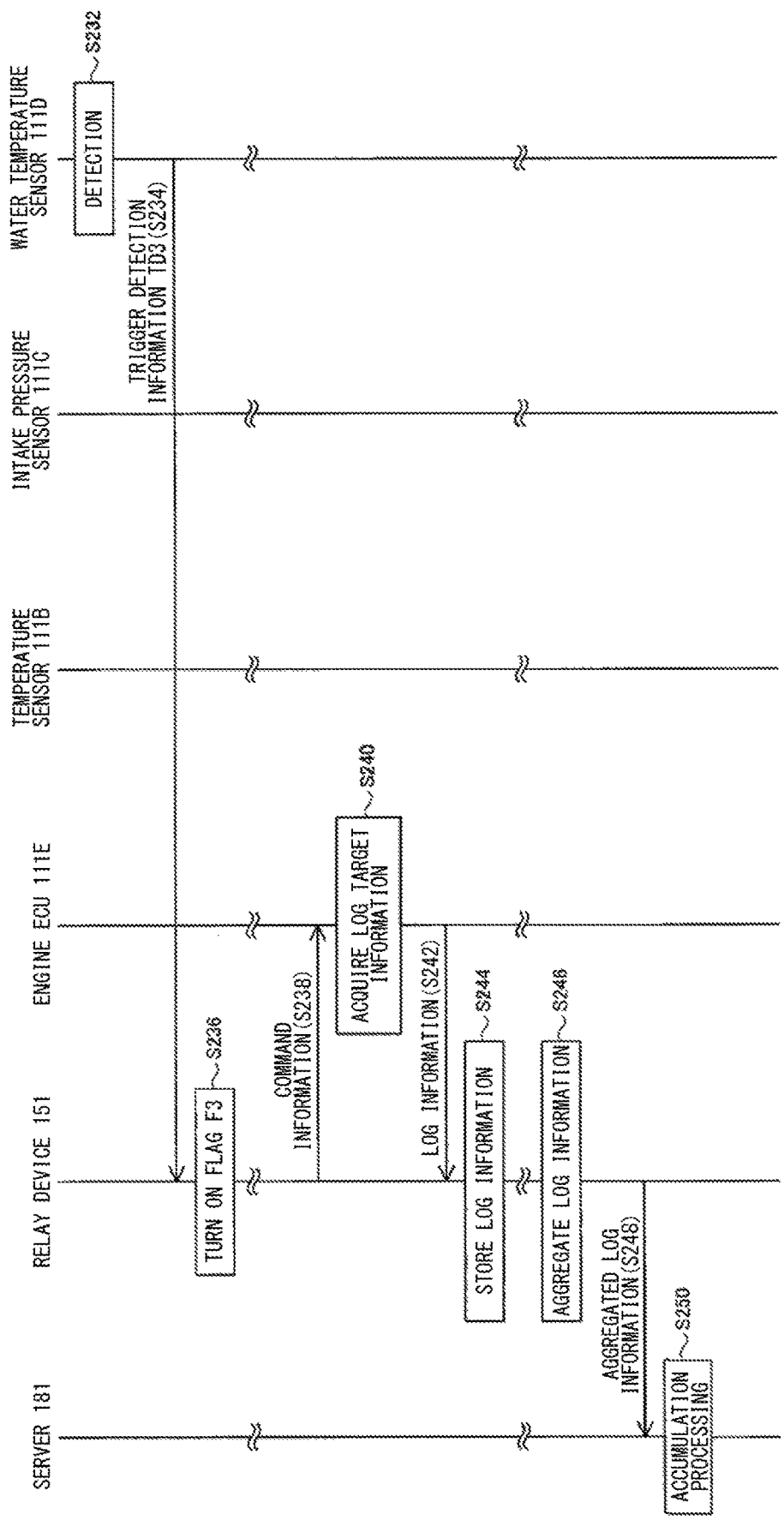
FIG. 9 is a chart showing the example of the sequence in the case where the relay device has received log notification information in the communication system according to the embodiment of the present disclosure.

FIG. 8 and FIG. 9 are charts showing an example of a sequence in a case where the relay device has received log notification information in the communication system according to the embodiment of the present disclosure. FIG. 9 shows continuation from the sequence shown in FIG. 8.

With reference to FIG. 3, FIG. 4, FIG. 8, and FIG. 9, first, the administrator inputs, to the server 181, a command for performing, in the vehicle 1, log collection for the correspondence relationship between the engine rotation speed and the brake torque when the ambient temperature is 9° C. to 11° C., the intake pressure is 45 kPa to 55 kPa, and the water temperature is 45° C. to 55° C. in the vehicle 1, for example (step S202).

Next, in response to the input from the administrator, the server 181 generates log notification information and transmits the generated log notification information to the relay device 151 in the vehicle 1 (step S204).

Specifically, the log notification information indicates, for example, an engine rotation speed and a brake torque as types of log target information, the address of the engine ECU 111E, i.e., the log address as the log target function unit, the addresses of the plurality of trigger function units, and the start conditions respectively associated with the addresses of the plurality of trigger function units.

Here, the addresses of the plurality of trigger function units are, for example, the address of the temperature sensor 111B, i.e., the first trigger address, the address (hereinafter, may be referred to as second trigger address) of the intake pressure sensor 111C, and the address (hereinafter, may be referred to as third trigger address) of the water temperature sensor 111D.

The start conditions respectively associated with the first trigger address, the second trigger address, and the third trigger address are that the ambient temperature is 9° C. to 11° C., the intake pressure is 45 kPa to 55 kPa, and the water temperature is 45° C. to 55° C.

Next, when the relay device 151 has received the log notification information from the server 181, the relay device 151 generates start condition information and command information on the basis of the received log notification information (step S206).

More specifically, when the processing unit 24 in the relay device 151 has received the log notification information from the server 181 via the TCU 111A, the relay processing unit 51, and the acquisition unit 21, the processing unit 24 acquires the following information from the received log notification information.

That is, the processing unit 24 acquires: the engine rotation speed and the brake torque as types of log target information; the log address; the first trigger address, the second trigger address, and the third trigger address; and conditions that the ambient temperature is 9° C. to 11° C., the intake pressure is 45 kPa to 55 kPa, and the water temperature is 45° C. to 55° C., as the start conditions respectively associated with the first trigger address, the second trigger address, and the third trigger address.

The processing unit 24 generates start condition information SC1 including the ambient temperature of 9° C. to 11° C. as the start condition, with the acquired first trigger address set as the destination address.

Similarly, the processing unit 24 generates start condition information SC2 including the intake pressure of 45 kPa to 55 kPa as the start condition, with the acquired second trigger address set as the destination address.

Similarly, the processing unit 24 generates start condition information SC3 including the water temperature of 45° C. to 55° C. as the start condition, with the acquired third trigger address set as the destination address.

In addition, the processing unit 24 generates command information including the engine rotation speed and the brake torque as types of log target information, with the acquired log address set as the destination address.

Next, the relay device 151 transmits the generated start condition information SC1 to the temperature sensor 111B (step S208).

More specifically, the processing unit 24 in the relay device 151 transmits the generated start condition information SC1 to the temperature sensor 111B via the notification unit 22 and the relay processing unit 51.

Next, when the temperature sensor 111B has received the start condition information SC1 from the relay device 151, the temperature sensor 111B sets the start condition included in the received start condition information SC1, i.e., the ambient temperature of 9° C. to 11° C., as a trigger condition (step S210).

Next, the relay device 151 transmits the generated start condition information SC2 to the intake pressure sensor 111C (step S212).

More specifically, the processing unit 24 in the relay device 151 transmits the generated start condition information SC2 to the intake pressure sensor 111C via the notification unit 22 and the relay processing unit 51.

Next, when the intake pressure sensor 111C has received the start condition information SC2 from the relay device 151, the intake pressure sensor 111C sets the start condition included in the received start condition information SC2, i.e., the intake pressure of 45 kPa to 55 kPa, as a trigger condition (step S214).

Next, the relay device 151 transmits the generated start condition information SC3 to the water temperature sensor 111D (step S216).

More specifically, the processing unit 24 in the relay device 151 transmits the generated start condition information SC3 to the water temperature sensor 111D via the notification unit 22 and the relay processing unit 51.

Next, when the water temperature sensor 111D has received the start condition information SC3 from the relay device 151, the water temperature sensor 111D sets the start condition included in the received start condition information SC3, i.e., the water temperature of 45° C. to 55° C., as a trigger condition (step S218).

Next, for example, the temperature sensor 111B measures an ambient temperature in a range of 9° C. to 11° C., and thus detects that the trigger condition for 9° C. to 11° C. is satisfied (step S220).

Next, the temperature sensor 111B transmits trigger detection information TD1 indicating that the trigger condition for 9° C. to 11° C. is satisfied, to the relay device 151 (step S222).

Next, when the relay device 151 has received the trigger detection information TD1 from the temperature sensor 111B, the relay device 151 turns on the corresponding flag on the basis of the received trigger detection information TD1 (step S224).

More specifically, when the processing unit 24 in the relay device 151 has received the trigger detection information TD1 from the temperature sensor 111B via the relay processing unit 51 and the acquisition unit 21, the processing unit 24 recognizes that the ambient temperature in a range of 9° C. to 11° C. has been measured by the temperature sensor 111B, on the basis of the received trigger detection information TD1.

The processing unit 24 turns on a flag F1 which indicates that the ambient temperature in a range of 9° C. to 11° C. has been measured by the temperature sensor 111B, for example. The flag F1 is turned off when a predetermined duration period has elapsed since the flag was turned on, for example.

The predetermined duration period is set in accordance with the degree of change in the ambient temperature.

Here, the above operation from step S220 to step S224 is repeated every time the trigger condition for 9° C. to 11° C. is satisfied in the temperature sensor 111B, for example.

Next, for example, the intake pressure sensor 111C measures an intake pressure in a range of 45 kPa to 55 kPa, and thus detects that the trigger condition for 45 kPa to 55 kPa is satisfied (step S226).

Next, the intake pressure sensor 111C transmits trigger detection information TD2 indicating that the trigger condition for 45 kPa to 55 kPa is satisfied, to the relay device 151 (step S228).

Next, when the relay device 151 has received the trigger detection information TD2 from the intake pressure sensor 111C, the relay device 151 turns on the corresponding flag on the basis of the received trigger detection information TD2 (step S230).

More specifically, when the processing unit 24 in the relay device 151 has received the trigger detection information TD2 from the intake pressure sensor 111C via the relay processing unit 51 and the acquisition unit 21, the processing unit 24 recognizes that the intake pressure in a range of 45 kPa to 55 kPa has been measured by the intake pressure sensor 111C, on the basis of the received trigger detection information TD2.

The processing unit 24 turns on a flag F2 which indicates that the intake pressure in a range of 45 kPa to 55 kPa has been measured by the intake pressure sensor 111C, for example. The flag F2 is turned off when a predetermined duration period has elapsed since the flag was turned on, for example. The predetermined duration period is set in accordance with the degree of change in the intake pressure, for example.

Here, the above operation from step S226 to step S230 is repeated every time the trigger condition for 45 kPa to 55 kPa is satisfied in the intake pressure sensor 111C, for example.

Next, for example, the water temperature sensor 111D measures a water temperature in a range of 45° C. to 55° C., and thus detects that the trigger condition for 45° C. to 55° C. is satisfied (step S232).

Next, the water temperature sensor 111D transmits trigger detection information TD3 indicating that the trigger condition for 45° C. to 55° C. is satisfied, to the relay device 151 (step S234).

Next, when the relay device 151 has received the trigger detection information TD3 from the water temperature sensor 111D, the relay device 151 turns on the corresponding flag on the basis of the received trigger detection information TD3 (step S236).

More specifically, when the processing unit 24 in the relay device 151 has received the trigger detection information TD3 from the water temperature sensor 111D via the relay processing unit 51 and the acquisition unit 21, the processing unit 24 recognizes that the water temperature in a range of 45° C. to 55° C. has been measured by the water temperature sensor 111D, on the basis of the received trigger detection information TD3.

The processing unit 24 turns on a flag F3 which indicates that the water temperature in a range of 45° C. to 55° C. has been measured by the water temperature sensor 111D, for example. The flag F3 is turned off when a predetermined duration period has elapsed since the flag was turned on, for example. The predetermined duration period is set in accordance with the degree of change in the water temperature, for example.

Here, the above operation from step S232 to step S236 is repeated every time the trigger condition for 45° C. to 55° C. is satisfied in the water temperature sensor 111D, for example.

Next, when all the flags F1 to F3 indicate ON, the processing unit 24 in the relay device 151 transmits the already generated command information to the engine ECU 111E via the relay processing unit 51 (step S238).

Next, when the engine ECU 111E has received the command information from the relay device 151, the engine ECU 111E acquires, in accordance with the received command information, the log target information included in the command information, i.e., each of information indicating the engine rotation speed and information indicating the brake torque, for one point (step S240).

Next, the engine ECU 111E transmits log information including the acquired information, to the relay device 151 (step S242).

Next, when the relay device 151 has received the log information from the engine ECU 111E, the relay device 151 stores the received log information (step S244).

More specifically, when the processing unit 24 in the relay device 151 has received the log information from the engine ECU 111E via the relay processing unit 51 and the acquisition unit 21, the processing unit 24 incorporates the start conditions that the ambient temperature is 9° C. to 11° C., the intake pressure is 45 kPa to 55 kPa, and the water temperature is 45° C. to 55° C., into the received log information. Then, the processing unit 24 stores the log information into the storage unit 23.

Here, the above operation from step S238 to step S244 is repeated every time the condition that all the flags F1 to F3 are turned on is satisfied.

Next, the relay device 151 aggregates the respective pieces of stored log information, thereby generating aggregated log information (step S246).

More specifically, for example, when the log information for a predetermined number of points is stored in the storage unit 23, the processing unit 24 in the relay device 151 aggregates the respective pieces of log information stored in the storage unit 23, thereby generating aggregated log information.

Next, the processing unit 24 transmits the generated aggregated log information to the server 181 via the relay processing unit 51 (step S248).

Next, when the server 181 has received the aggregated log information from the relay device 151, the server 181 performs accumulation processing for accumulating the received aggregated log information (step S250).

In the above flow of operation, the start conditions are that the ambient temperature, the intake pressure, and the water temperature become values within specific ranges. However, the start conditions are not limited thereto. The start conditions may be that the ambient temperature, the intake pressure, and the water temperature become specific values.

The order of steps S208 and S210, steps S212 and S214, and steps S216 and S218 is not limited to the above order. A part or the entirety of the order may be changed.

The order of steps S220 to S224, steps S226 to S230, and steps S232 to S236 is not limited to the above order. A part or the entirety of the order may be changed.

In the above steps S224, S230, S236, each flag F1 to F3 is automatically turned off when the corresponding duration period has elapsed since the flag was turned on. However, the present disclosure is not limited thereto. Each flag F1 to F3 may be turned on during a period in which the corresponding trigger condition is satisfied, and may be turned off when the corresponding trigger condition is no longer satisfied.

Figure 10:
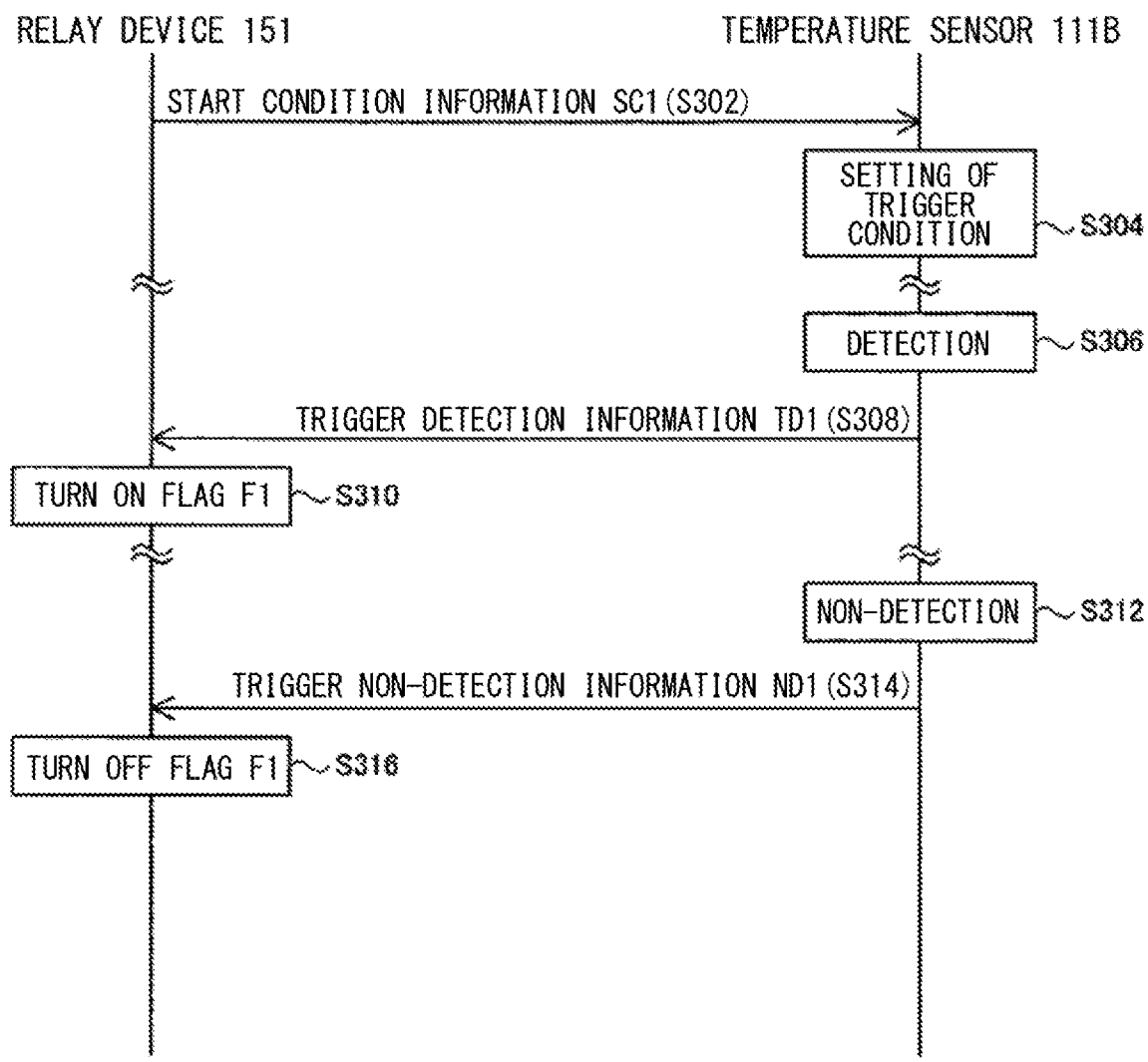
FIG. 10 is a chart showing an example of a sequence in a case where a temperature sensor has received start condition information in the on-vehicle communication system according to the embodiment of the present disclosure.

FIG. 10 is a chart showing an example of a sequence in a case where the temperature sensor has received start condition information in the on-vehicle communication system according to the embodiment of the present disclosure.

With reference to FIG. 10, first, the relay device 151 transmits the start condition information SC1 to the temperature sensor 111B (step S302).

Next, when the temperature sensor 111B has received the start condition information SC1 from the relay device 151, the temperature sensor 111B sets the start condition included in the received start condition information SC1, i.e., an ambient temperature of 9° C. to 11° C., as a trigger condition (step S304).

Next, for example, the temperature sensor 111B measures an ambient temperature in a range of 9° C. to 11° C., and thus detects that the trigger condition for 9° C. to 11° C. is satisfied (step S306).

Next, the temperature sensor 111B transmits the trigger detection information TD1 indicating that the trigger condition for 9° C. to 11° C. is satisfied, to the relay device 151 (step S308).

Next, when the relay device 151 has received the trigger detection information TD1 from the temperature sensor 111B, the relay device 151 turns on the flag F1 on the basis of the received trigger detection information TD1 (step S310). In this example, the predetermined duration period is not set for the flag F1.

Next, for example, the temperature sensor 111B measures an ambient temperature other than 9° C. to 11° C., and thus no longer detects that the trigger condition for 9° C. to 11° C. is satisfied (step S312).

Next, the temperature sensor 111B transmits trigger non-detection information ND1 indicating that the trigger condition for 9° C. to 11° C. is not satisfied, to the relay device 151 (step S314).

Next, when the relay device 151 has received the trigger non-detection information ND1 from the temperature sensor 111B, the relay device 151 turns off the flag F1 on the basis of the received trigger non-detection information ND1 (step S316).

Also in the intake pressure sensor 111C, as in the temperature sensor 111B, when it is detected that the trigger condition for 45 kPa to 55 kPa is satisfied (step S306), the trigger detection information TD2 is transmitted to the relay device 151 (step S308), and when it is no longer detected that the trigger condition for 45 kPa to 55 kPa is satisfied (step S312), trigger non-detection information ND2 is transmitted to the relay device 151 (step S314).

In this case, when the relay device 151 has received the trigger detection information TD2 from the intake pressure sensor 111C, the relay device 151 turns on the flag F2 (step S310), and when the relay device 151 has received the trigger non-detection information ND2 from the intake pressure sensor 111C, the relay device 151 turns off the flag F2 (step S316).

Similarly, also in the water temperature sensor 111D, when it is detected that the trigger condition for 45° C. to 55° C. is satisfied (step S306), the trigger detection information TD3 is transmitted to the relay device 151 (step S308), and when it is no longer detected that the trigger condition for 45° C. to 55° C. is satisfied (step S312), trigger non-detection information ND3 is transmitted to the relay device 151 (step S314).

In this case, when the relay device 151 has received the trigger detection information TD3 from the water temperature sensor 111D, the relay device 151 turns on the flag F3 (step S310), and when the relay device 151 has received the trigger non-detection information ND3 from the water temperature sensor 111D, the relay device 151 turns off the flag F3 (step S316).

Figure 11:
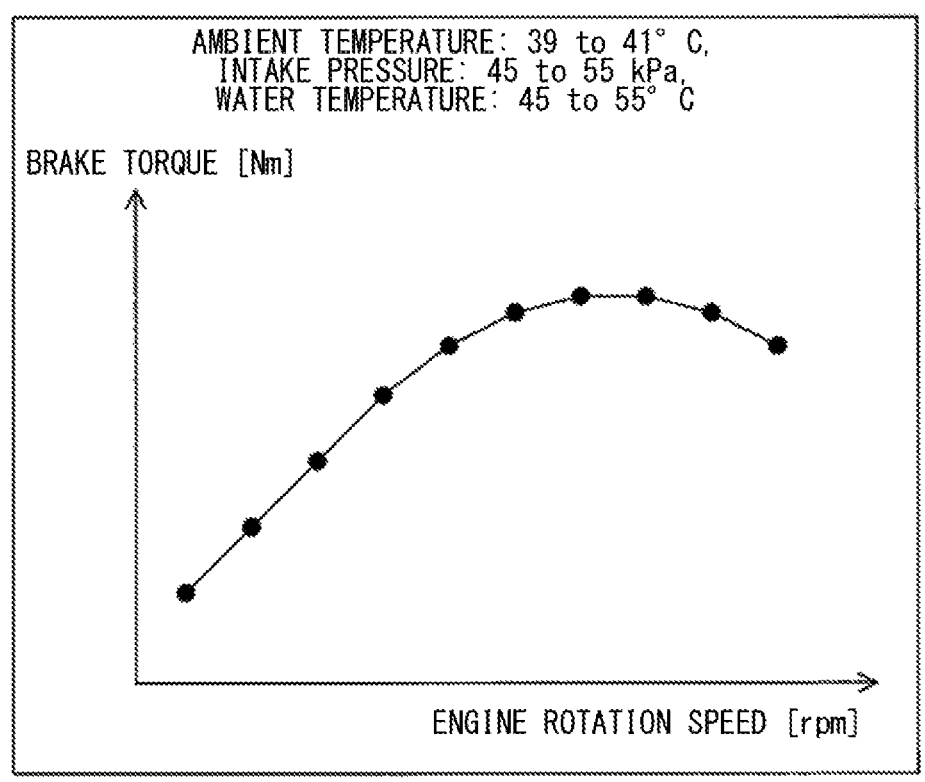
FIG. 11 shows an example of aggregated log information collected in the communication system according to the embodiment of the present disclosure.

FIG. 11 shows an example of aggregated log information collected in the communication system according to the embodiment of the present disclosure. It is noted that how to read FIG. 11 is the same as in FIG. 7.

With reference to FIG. 11, the aggregated log information including the correspondence relationship between the engine rotation speed and the brake torque when the ambient temperature is 9° C. to 11° C., the intake pressure is 45 kPa to 55 kPa, and the water temperature is 45° C. to 55° C., which is required by the administrator, is accumulated in the server 181.

As shown in FIG. 11, it is possible to plot, on a graph, a traveling performance curve for a case where the ambient temperature is 9° C. to 11° C., the intake pressure is 45 kPa to 55 kPa, and the water temperature is 45° C. to 55° C., using the aggregated log information accumulated in the server 181.

Modification 2 of Log Notification Information

In the above configuration, the log notification information indicates a plurality of start conditions associated with one trigger function unit. However, the log notification information is not limited thereto. The log notification information may indicate a plurality of trigger function units and a plurality of sets of start conditions respectively associated with the plurality of trigger function units.

In this case, the processing unit 24 in the log collection device 101 gives a command for log collection when the start conditions in any one of the plurality of sets are all satisfied.

Figure 12:
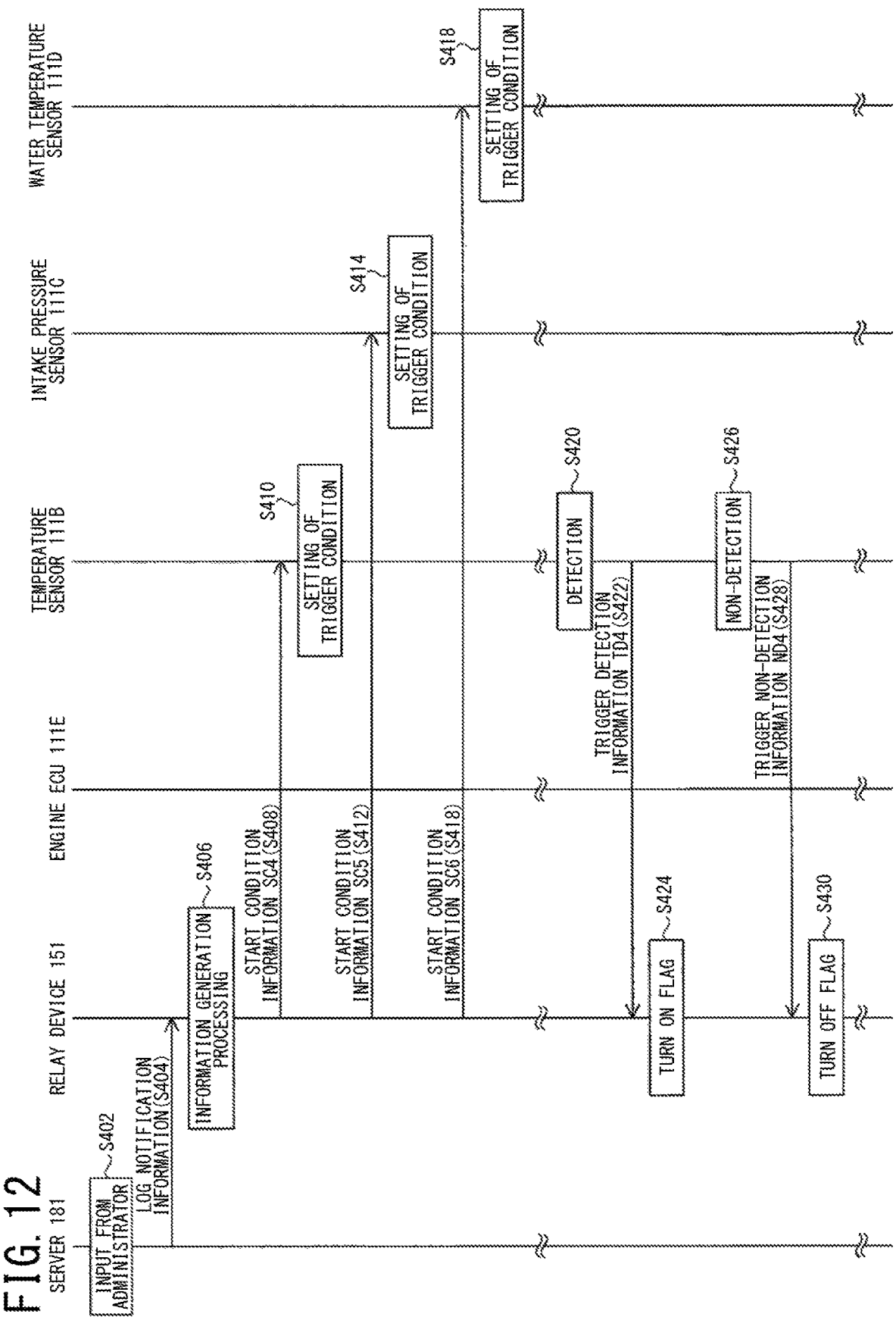
FIG. 12 is a chart showing an example of a sequence in a case where the relay device has received log notification information in the communication system according to the embodiment of the present disclosure.
Figure 13:
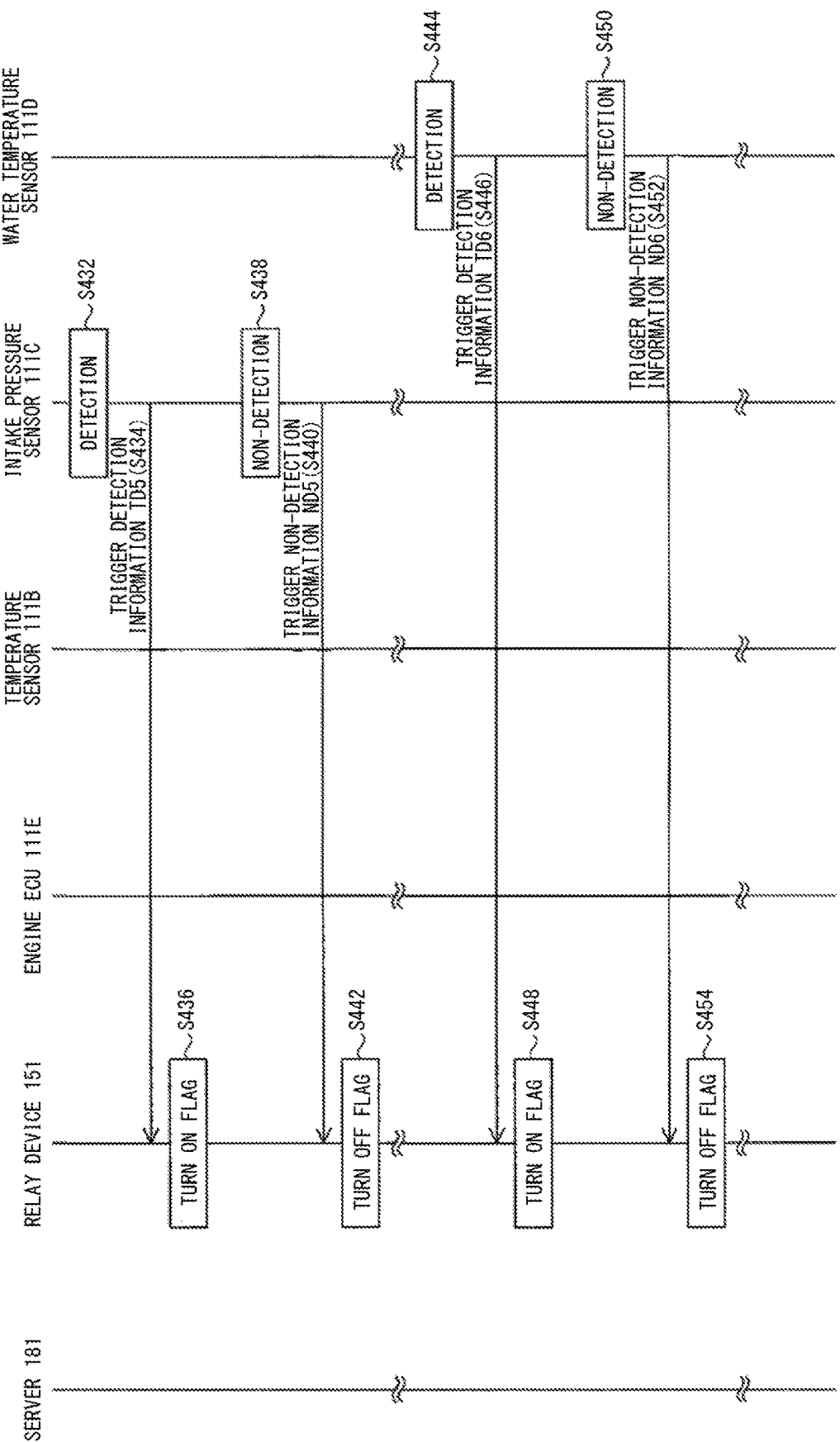
FIG. 13 is a chart showing the example of the sequence in the case where the relay device has received log notification information in the communication system according to the embodiment of the present disclosure.
Figure 14:
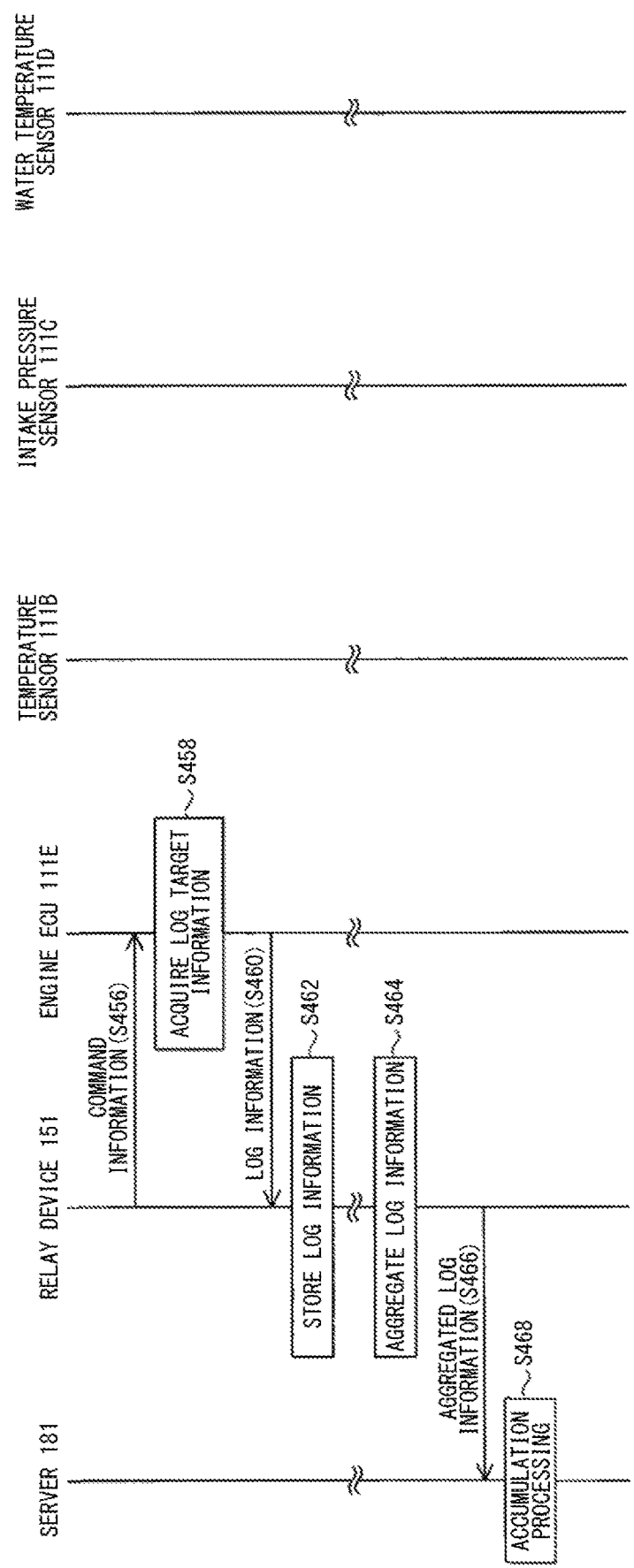
FIG. 14 is a chart showing the example of the sequence in the case where the relay device has received log notification information in the communication system according to the embodiment of the present disclosure.

FIG. 12, FIG. 13, and FIG. 14 are charts showing an example of a sequence in a case where the relay device has received log notification information in the communication system according to the embodiment of the present disclosure. FIG. 13 shows continuation from the sequence shown in FIG. 12. FIG. 14 shows continuation from the sequence shown in FIG. 13.

With reference to FIG. 3, FIG. 4, and FIG. 12 to FIG. 14, first, the administrator inputs, to the server 181, a command for performing, in the vehicle 1, log collection for the correspondence relationship between the engine rotation speed and the brake torque when the vehicle 1 is in the following states ST1, ST2, ST3, for example (step S402).

Here, the state ST1 is a state in which the ambient temperature is 39° C. to 41° C., the intake pressure is 45 kPa to 55 kPa, and the water temperature is 45° C. to 55° C.

The state ST2 is a state in which the ambient temperature is 19° C. to 21° C., the intake pressure is 81 kPa to 99 kPa, and the water temperature is 20° C. to 30° C.

The state ST3 is a state in which the ambient temperature is −1° C. to 1° C., the intake pressure is 9 kPa to 11 kPa, and the water temperature is 0° C. to 10° C.

Next, in response to the input from the administrator, the server 181 generates log notification information, and transmits the generated log notification information to the relay device 151 in the vehicle 1 (step S404).

Specifically, the log notification information indicates, for example, the engine rotation speed and the brake torque as types of log target information, the address of the engine ECU 111E, i.e., the log address as the log target function unit, and sets CL1, CL2, CL3.

Here, each of the sets CL1, CL2, CL3 includes the addresses of a plurality of trigger function units, and start conditions respectively associated with the addresses of the plurality of trigger function units. The sets CL1, CL2, CL3 are generated on the basis of the states ST1, ST2, ST3, respectively.

Specifically, the addresses of the plurality of trigger function units in each of the sets CL1, CL2, CL3 are the address of the temperature sensor 111B, i.e., the first trigger address, the address of the intake pressure sensor 111C, i.e., the second trigger address, and the address of the water temperature sensor 111D, i.e., the third trigger address.

The start conditions included in the set CL1 and respectively associated with the first trigger address, the second trigger address, and the third trigger address are that the ambient temperature is 39° C. to 41° C., the intake pressure is 45 kPa to 55 kPa, and the water temperature is 45° C. to 55° C.

The start conditions included in the set CL2 and respectively associated with the first trigger address, the second trigger address, and the third trigger address are that the ambient temperature is 19° C. to 21° C., the intake pressure is 81 kPa to 99 kPa, and the water temperature is 20° C. to 30° C.

The start conditions included in the set CL3 and respectively associated with the first trigger address, the second trigger address, and the third trigger address are that the ambient temperature is –1° C. to 1° C., the intake pressure is 9 kPa to 11 kPa, and the water temperature is 0° C. to 10° C.

Next, when the relay device 151 has received the log notification information from the server 181, the relay device 151 generates start condition information and command information on the basis of the received log notification information (step S406).

More specifically, when the processing unit 24 in the relay device 151 has received the log notification information from the server 181 via the TCU 111A, the relay processing unit 51, and the acquisition unit 21, the processing unit 24 acquires the following information from the received log notification information.

That is, the processing unit 24 acquires the engine rotation speed and the brake torque as types of log target information, the log address, and the sets CL1, CL2, CL3.

On the basis of the acquired sets CL1, CL2, CL3, the processing unit 24 generates start condition information SC4 including an ambient temperature of 39° C. to 41° C., an ambient temperature of 19° C. to 21° C., and an ambient temperature of –1° C. to 1° C. as the start conditions, with the first trigger address set as the destination address.

Similarly, on the basis of the acquired sets CL1, CL2, CL3, the processing unit 24 generates start condition information SC5 including an intake pressure of 45 kPa to 55 kPa, an intake pressure of 81 kPa to 99 kPa, and an intake pressure of 9 kPa to 11 kPa as the start conditions, with the second trigger address set as the destination address.

Similarly, on the basis of the acquired sets CL1, CL2, CL3, the processing unit 24 generates start condition information SC6 including a water temperature of 45° C. to 55° C., a water temperature of 20° C. to 30° C., and a water temperature of 0° C. to 10° C. as the start conditions, with the third trigger address set as the destination address.

In addition, the processing unit 24 generates command information including the engine rotation speed and the brake torque as types of log target information, with the acquired log address set as the destination address.

Next, the relay device 151 transmits the generated start condition information SC4 to the temperature sensor 111B (step S408).

More specifically, the processing unit 24 in the relay device 151 transmits the generated start condition information SC4 to the temperature sensor 111B via the notification unit 22 and the relay processing unit 51.

Next, when the temperature sensor 111B has received the start condition information SC4 from the relay device 151, the temperature sensor 111B sets the start conditions included in the received start condition information SC4, i.e., the ambient temperature of 39° C. to 41° C., the ambient temperature of 19° C. to 21° C., and the ambient temperature of –1° C. to 1° C., as trigger conditions T41, T42, and T43 (step S410).

Next, the relay device 151 transmits the generated start condition information SC5 to the intake pressure sensor 111C (step S412).

More specifically, the processing unit 24 in the relay device 151 transmits the generated start condition information SC5 to the intake pressure sensor 111C via the notification unit 22 and the relay processing unit 51.

Next, when the intake pressure sensor 111C has received the start condition information SC5 from the relay device 151, the intake pressure sensor 111C sets the start conditions included in the received start condition information SC5, i.e., the intake pressure of 45 kPa to 55 kPa, the intake pressure of 81 kPa to 99 kPa, and the intake pressure of 9 kPa to 11 kPa, as trigger conditions T51, T52, and T53 (step S414).

Next, the relay device 151 transmits the generated start condition information SC6 to the water temperature sensor 111D (step S416).

More specifically, the processing unit 24 in the relay device 151 transmits the generated start condition information SC6 to the water temperature sensor 111D via the notification unit 22 and the relay processing unit 51.

Next, when the water temperature sensor 111D has received the start condition information SC6 from the relay device 151, the water temperature sensor 111D sets the start conditions included in the received start condition information SC6, i.e., the water temperature of 45° C. to 55° C., the water temperature of 20° C. to 30° C., and the water temperature of 0° C. to 10° C., as trigger conditions T61, T62, and T63 (step S418).

Next, for example, the temperature sensor 111B measures an ambient temperature in any one of ranges of 39° C. to 41° C., 19° C. to 21° C., and –1° C. to 1° C., and thus detects that the trigger condition T41, T42, or T43 is satisfied (step S420).

Next, when the temperature sensor 111B has detected that the trigger condition T41, T42, or T43 is satisfied, the temperature sensor 111B transmits trigger detection information TD4 indicating that the trigger condition for 39° C. to 41° C. is satisfied, the trigger condition for 19° C. to 21° C. is satisfied, or the trigger condition for –1° C. to 1° C. is satisfied, to the relay device 151 (step S422).

Next, when the relay device 151 has received the trigger detection information TD4 from the temperature sensor 111B, the relay device 151 turns on the corresponding flag on the basis of the received trigger detection information TD4 (step S424).

More specifically, when the processing unit 24 in the relay device 151 has received the trigger detection information TD4 from the temperature sensor 111B via the relay processing unit 51 and the acquisition unit 21, the processing unit 24 performs the following processing.

That is, when the trigger detection information TD4 indicates that the trigger condition for 39° C. to 41° C. is satisfied, the processing unit 24 turns on a flag F41 which indicates that an ambient temperature in a range of 39° C. to 41° C. has been measured by the temperature sensor 111B.

When the trigger detection information TD4 indicates that the trigger condition for 19° C. to 21° C. is satisfied, the processing unit 24 turns on a flag F42 which indicates that an ambient temperature in a range of 19° C. to 21° C. has been measured by the temperature sensor 111B.

When the trigger detection information TD4 indicates that the trigger condition for −1° C. to 1° C. is satisfied, the processing unit 24 turns on a flag F43 which indicates that an ambient temperature in a range of −1° C. to 1° C. has been measured by the temperature sensor 111B.

Next, the temperature sensor 111B measures an ambient temperature that is not in any of ranges of 39° C. to 41° C., 19° C. to 21° C., and −1° C. to 1° C., and thus no longer detects that the trigger conditions T41, T42, and T43 are satisfied (step S426).

Next, when the temperature sensor 111B no longer detects that the trigger condition T41, T42, or T43 is satisfied, the temperature sensor 111B transmits trigger non-detection information ND4 indicating that the trigger condition for 39° C. to 41° C. is not satisfied, the trigger condition for 19° C. to 21° C. is not satisfied, or the trigger condition for −1° C. to 1° C. is not satisfied, to the relay device 151 (step S428).

Next, when the relay device 151 has received the trigger non-detection information ND4 from the temperature sensor 111B, the relay device 151 turns off the corresponding flag on the basis of the received trigger non-detection information ND4 (step S430).

More specifically, when the processing unit 24 in the relay device 151 has received the trigger non-detection information ND4 from the temperature sensor 111B via the relay processing unit 51 and the acquisition unit 21, the processing unit 24 performs the following processing.

That is, when the trigger non-detection information ND4 indicates that the trigger condition for 39° C. to 41° C. is not satisfied, the processing unit 24 turns off the flag F41.

When the trigger non-detection information ND4 indicates that the trigger condition for 19° C. to 21° C. is not satisfied, the processing unit 24 turns off the flag F42.

When the trigger non-detection information ND4 indicates that the trigger condition for −1° C. to 1° C. is not satisfied, the processing unit 24 turns off the flag F43.

Here, the above operation from step S420 to step S430 is repeated every time any one of the trigger conditions T41, T42, and T43 is satisfied in the temperature sensor 111B, for example.

Next, for example, the intake pressure sensor 111C measures an intake pressure in any of ranges of 45 kPa to 55 kPa, 81 kPa to 99 kPa, and 9 kPa to 11 kPa, and thus detects that the trigger condition T51, T52, or T53 is satisfied (step S432).

Next, when the intake pressure sensor 111C has detected that the trigger condition T51, T52, or T53 is satisfied, the intake pressure sensor 111C transmits trigger detection information TD5 indicating that the trigger condition for 45 kPa to 55 kPa is satisfied, the trigger condition for 81 kPa to 99 kPa is satisfied, or the trigger condition for 9 kPa to 11 kPa is satisfied, to the relay device 151 (step S434).

Next, when the relay device 151 has received the trigger detection information TD5 from the intake pressure sensor 111C, the relay device 151 turns on the corresponding flag on the basis of the received trigger detection information TD5 (step S436).

More specifically, when the processing unit 24 in the relay device 151 has received the trigger detection information TD5 from the intake pressure sensor 111C via the relay processing unit 51 and the acquisition unit 21, the processing unit 24 performs the following processing.

That is, when the trigger detection information TD5 indicates that the trigger condition for 45 kPa to 55 kPa is satisfied, the processing unit 24 turns on a flag F51 which indicates that an intake pressure in a range of 45 kPa to 55 kPa has been measured by the intake pressure sensor 111C.

When the trigger detection information TD5 indicates that the trigger condition for 81 kPa to 99 kPa is satisfied, the processing unit 24 turns on a flag F52 which indicates that an intake pressure in a range of 81 kPa to 99 kPa has been measured by the intake pressure sensor 111C.

When the trigger detection information TD5 indicates that the trigger condition for 9 kPa to 11 kPa is satisfied, the processing unit 24 turns on a flag F53 which indicates that an intake pressure in a range of 9 kPa to 11 kPa has been measured by the intake pressure sensor 111C.

Next, for example, the intake pressure sensor 111C measures an intake pressure that is not in any of ranges of 45 kPa to 55 kPa, 81 kPa to 99 kPa, and 9 kPa to 11 kPa, and thus no longer detects that the trigger conditions T51, T52, and T53 are satisfied (step S438).

Next, when the intake pressure sensor 111C no longer detects that the trigger condition T51, T52, or T53 is satisfied, the intake pressure sensor 111C transmits trigger non-detection information ND5 indicating that the trigger condition for 45 kPa to 55 kPa is not satisfied, the trigger condition for 81 kPa to 99 kPa is not satisfied, or the trigger condition for 9 kPa to 11 kPa is not satisfied, to the relay device 151 (step S440).

Next, when the relay device 151 has received the trigger non-detection information ND5 from the intake pressure sensor 111C, the relay device 151 turns off the corresponding flag on the basis of the received trigger non-detection information ND5 (step S442).

More specifically, when the processing unit 24 in the relay device 151 has received the trigger non-detection information ND5 from the intake pressure sensor 111C via the relay processing unit 51 and the acquisition unit 21, the processing unit 24 performs the following processing.

That is, when the trigger non-detection information ND5 indicates that the trigger condition for 45 kPa to 55 kPa is not satisfied, the processing unit 24 turns off the flag F51.

When the trigger non-detection information ND5 indicates that the trigger condition for 81 kPa to 99 kPa is not satisfied, the processing unit 24 turns off the flag F52.

When the trigger non-detection information ND5 indicates that the trigger condition for 9 kPa to 11 kPa is not satisfied, the processing unit 24 turns off the flag F53.

Here, the above operation from step S432 to step S442 is repeated every time any one of the trigger conditions T51, T52, and T53 is satisfied in the intake pressure sensor 111C, for example.

Next, for example, the water temperature sensor 111D measures a water temperature in any one of ranges of 45° C. to 55° C., 20° C. to 30° C., and 0° C. to 10° C., and thus detects that the trigger condition T61, T62, or T63 is satisfied (step S444).

Next, when the water temperature sensor 111D has detected that the trigger condition T61, T62, or T63 is satisfied, the water temperature sensor 111D transmits trigger detection information TD6 indicating that the trigger condition for 45° C. to 55° C. is satisfied, the trigger condition for 20° C. to 30° C. is satisfied, or the trigger condition for 0° C. to 10° C. is satisfied, to the relay device 151 (step S446).

Next, when the relay device 151 has received the trigger detection information TD6 from the water temperature sensor 111D, the relay device 151 turns on the corresponding flag on the basis of the received trigger detection information TD6 (step S448).

More specifically, when the processing unit 24 in the relay device 151 has received the trigger detection information TD6 from the water temperature sensor 111D via the relay processing unit 51 and the acquisition unit 21, the processing unit 24 performs the following processing.

That is, when the trigger detection information TD6 indicates that the trigger condition for 45° C. to 55° C. is satisfied, the processing unit 24 turns on a flag F61 which indicates that a water temperature in a range of 45° C. to 55° C. has been measured by the water temperature sensor 111D.

When the trigger detection information TD6 indicates that the trigger condition for 20° C. to 30° C. is satisfied, the processing unit 24 turns on a flag F62 which indicates that a water temperature in a range of 20° C. to 30° C. has been measured by the water temperature sensor 111D.

When the trigger detection information TD6 indicates that the trigger condition for 0° C. to 10° C. is satisfied, the processing unit 24 turns on a flag F63 which indicates that a water temperature in a range of 0° C. to 10° C. has been measured by the water temperature sensor 111D.

Next, for example, the water temperature sensor 111D measures a water temperature that is not in any of ranges of 45° C. to 55° C., 20° C. to 30° C., and 0° C. to 10° C., and thus no longer detects that the trigger conditions T61, T62, and T63 are satisfied (step S450).

Next, when the water temperature sensor 111D no longer detects that the trigger condition T61, T62, or T63 is satisfied, the water temperature sensor 111D transmits trigger non-detection information ND6 indicating that the trigger condition for 45° C. to 55° C. is not satisfied, the trigger condition for 20° C. to 30° C. is not satisfied, or the trigger condition for 0° C. to 10° C. is not satisfied, to the relay device 151 (step S452).

Next, when the relay device 151 has received the trigger non-detection information ND6 from the water temperature sensor 111D, the relay device 151 turns off the corresponding flag on the basis of the received trigger non-detection information ND6 (step S454).

More specifically, when the processing unit 24 in the relay device 151 has received the trigger non-detection information ND6 from the water temperature sensor 111D via the relay processing unit 51 and the acquisition unit 21, the processing unit 24 performs the following processing.

That is, when the trigger non-detection information ND6 indicates that the trigger condition for 45° C. to 55° C. is not satisfied, the processing unit 24 turns off the flag F61.

When the trigger non-detection information ND6 indicates that the trigger condition for 20° C. to 30° C. is not satisfied, the processing unit 24 turns off the flag F62.

When the trigger non-detection information ND6 indicates that the trigger condition for 0° C. to 10° C. is not satisfied, the processing unit 24 turns off the flag F63.

Here, the above operation from step S444 to step S454 is repeated every time any one of the trigger conditions T61, T62, and T63 is satisfied in the water temperature sensor 111D, for example.

Next, when the flags F41, F51, F61 corresponding to the set CL1 all indicate ON, when the flags F42, F52, F62 corresponding to the set CL2 all indicate ON, or when the flags F43, F53, F63 corresponding to the set CL3 all indicate ON, the processing unit 24 in the relay device 151 transmits the already generated command information to the engine ECU 111E via the relay processing unit 51 (step S456).

Next, when the engine ECU 111E has received the command information from the relay device 151, the engine ECU 111E acquires, in accordance with the received command information, the log target information included in the command information, i.e., each of information indicating the engine rotation speed and information indicating the brake torque, for one point (step S458).

Next, the engine ECU 111E transmits log information including the acquired information, to the relay device 151 (step S460).

Next, when the relay device 151 has received the log information from the engine ECU 111E, the relay device 151 stores the received log information (step S462).

More specifically, when the processing unit 24 in the relay device 151 has received the log information from the engine ECU 111E via the relay processing unit 51 and the acquisition unit 21, the processing unit 24 performs the following processing.

That is, when the flags F41, F51, F61 corresponding to the set CL1 all indicate ON, the processing unit 24 incorporates the start conditions included in the set CL1 that the ambient temperature is 39° C. to 41° C., the intake pressure is 45 kPa to 55 kPa, and the water temperature is 45° C. to 55° C., into the received log information.

When the flags F42, F52, F62 corresponding to the set CL2 all indicate ON, the processing unit 24 incorporates the start conditions included in the set CL2 that the ambient temperature is 19° C. to 21° C., the intake pressure is 81 kPa to 99 kPa, and the water temperature is 20° C. to 30° C., into the received log information.

When the flags F43, F53, F63 corresponding to the set CL3 all indicate ON, the processing unit 24 incorporates the start conditions included in the set CL3 that the ambient temperature is −1° C. to 1° C., the intake pressure is 9 kPa to 11 kPa, and the water temperature is 0° C. to 10° C., into the received log information. Then, the processing unit 24 stores the log information into the storage unit 23.

Here, the above operation from step S456 to step S462 is repeated every time any one of the condition that the flags F41, F51, F61 are all turned on, the condition that the flags F42, F52, F62 are all turned on, and the condition that the flags F43, F53, F63 are all turned on, is satisfied.

Next, the relay device 151 aggregates the respective pieces of stored log information, thereby generating aggregated log information (step S464).

More specifically, for example, when the log information for a predetermined number of points is stored in the storage unit 23, the processing unit 24 in the relay device 151 aggregates the respective pieces of log information stored in the storage unit 23, thereby generating aggregated log information.

Next, the processing unit 24 transmits the generated aggregated log information to the server 181 via the relay processing unit 51 (step S466).

Next, when the server 181 has received the aggregated log information from the relay device 151, the server 181 performs accumulation processing for accumulating the received aggregated log information (step S468).

In the above flow of operation, the start conditions are that the ambient temperature, the intake pressure, and the water temperature become values within specific ranges. However, the start conditions are not limited thereto. The start conditions may be that the ambient temperature, the intake pressure, and the water temperature become specific values.

The order of steps S408 and S410, steps S412 and S414, and steps S416 and S418 is not limited to the above order. A part or the entirety of the order may be changed.

The order of steps S420 to S430, steps S432 to S442, and steps S444 to S454 is not limited to the above order. A part or the entirety of the order may be changed.

In the above configuration, each flag F41 to F43, F51 to F53, F61 to F63 is turned on during a period in which the corresponding trigger condition is satisfied (steps S424, S436, S448), and is turned off when the corresponding trigger condition is no longer satisfied (steps S430, S442, S454). However, the present disclosure is not limited thereto. Each flag F41 to F43, F51 to F53, F61 to F63 may be automatically turned off when a corresponding duration period has elapsed since the flag was turned on.

Figure 15:
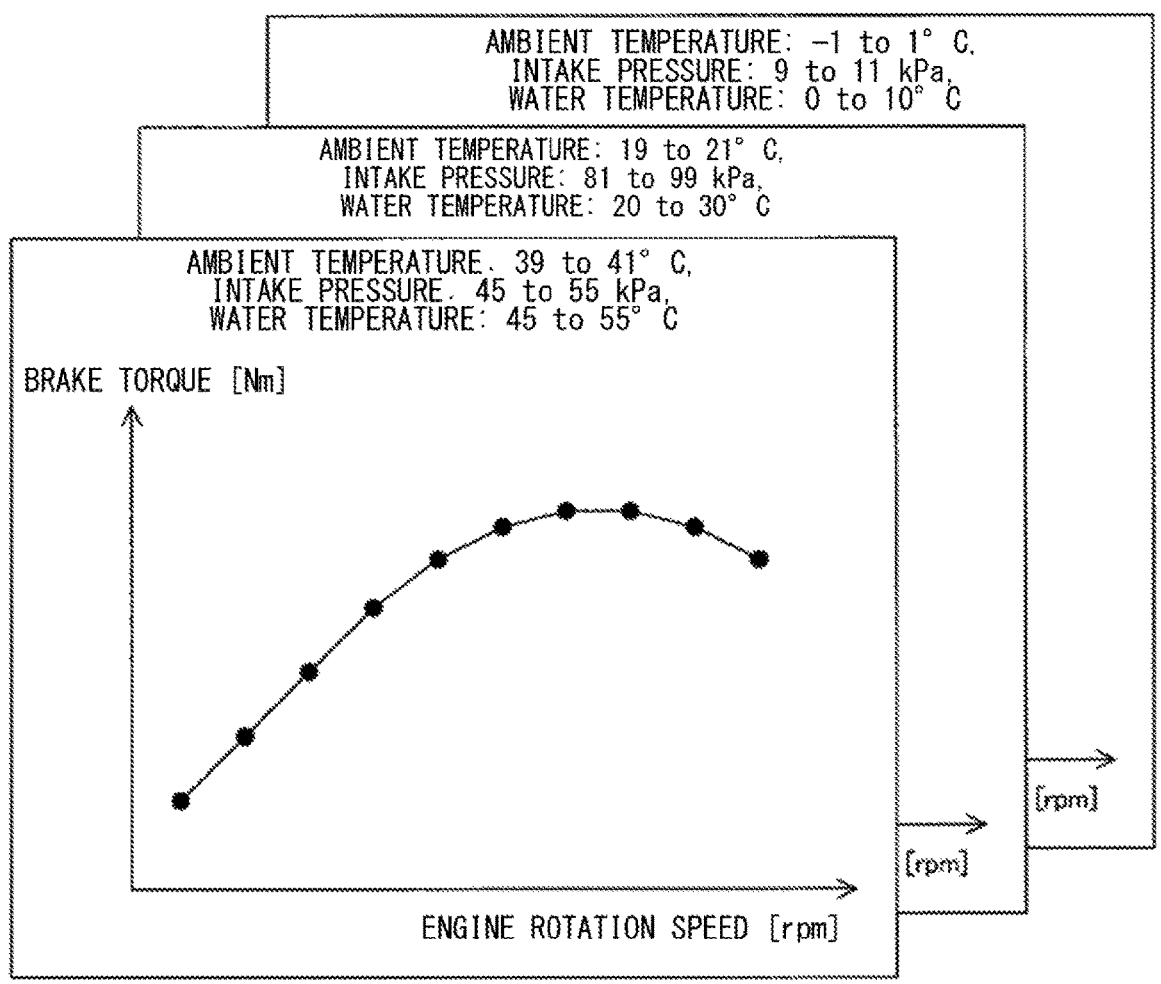
FIG. 15 shows an example of aggregated log information collected in the communication system according to the embodiment of the present disclosure.

FIG. 15 shows an example of aggregated log information collected in the communication system according to the embodiment of the present disclosure. It is noted that how to read FIG. 15 is the same as in FIG. 7.

With reference to FIG. 15, the aggregated log information including the correspondence relationship between the engine rotation speed and the brake torque in the above states ST1, ST2, ST3, which is required by the administrator, is accumulated in the server 181.

As shown in FIG. 15, it is possible to plot, on a graph, a traveling performance curve for each of the states ST1, ST2, ST3, using the aggregated log information accumulated in the server 181.

The communication system according to the embodiment of the present disclosure is configured such that the log notification information includes the type of log target information. However, the present disclosure is not limited thereto. For example, in a case where operation is performed with the type of log target information fixed, the log notification information may not include the type of log target information.

In the communication system according to the embodiment of the present disclosure, the log target function unit is the engine ECU 111E. However, the log target function unit is not limited thereto. The log target function unit may be an on-vehicle ECU 111 other than the engine ECU 111E.

In the communication system according to the embodiment of the present disclosure, the trigger function unit is the temperature sensor 111B, the intake pressure sensor 111C, or the water temperature sensor 111D. However, the trigger function unit is not limited thereto. The trigger function unit may be an on-vehicle ECU 111 other than the temperature sensor 111B, the intake pressure sensor 111C, and the water temperature sensor 111D.

In the relay device according to the embodiment of the present disclosure, at least one of the number of start conditions and the number of trigger function units is plural. However, these numbers are not limited thereto. Both of the number of start conditions and the number of trigger function units may be one.

The on-vehicle control device in the on-vehicle network described in PATENT LITERATURE 1 performs, for example, measurement of the environment and the state of a vehicle, control for components constituting the vehicle, and the like.

It is preferable that a result of the measurement and a result of the control by the on-vehicle control device are recorded as logs because they are useful for vehicle development or the like. However, if all the information is recorded as logs, the data amount becomes enormous. Technology for efficiently collecting logs is required.

In this regard, the relay device according to the embodiment of the present disclosure can relay data between a plurality of function units mounted on the vehicle 1. The acquisition unit 21 receives a log notification indicating a log target function unit which is a function unit that is a target of log collection, a start condition for log collection, and a trigger function unit which is a function unit capable of determination for the start condition, from an external device outside the vehicle 1, e.g., from the server 181. The notification unit 22 notifies the trigger function unit of the start condition indicated by the log notification. Then, in response to a notification that the start condition is satisfied from the trigger function unit, the processing unit 24 gives a command for log collection to the log target function unit.

With this configuration, for example, by setting a log notification for collecting logs useful for vehicle development in the server 181 as appropriate, log collection only for such useful logs can be performed. Therefore, logs can be efficiently collected in the on-vehicle network. Thus, it is possible to utilize, for vehicle development, the learned contents about results of measurements of the environment and the state of the vehicle 1 and a result of control for components constituting the vehicle 1, for example.

In the relay device according to the embodiment of the present disclosure, the log notification indicates a plurality of start conditions associated with one trigger function unit.

With this configuration, for example, it is possible to efficiently collect logs classified for each vehicle state or each vehicle environment.

In the relay device according to the embodiment of the present disclosure, the log notification indicates a plurality of trigger function units and a set of a plurality of start conditions respectively associated with the plurality of trigger function units. Then, when the plurality of start conditions are all satisfied, the processing unit 24 gives a command for log collection.

With this configuration, for example, logs in a specific vehicle state and a specific vehicle environment, which are required for vehicle development, can be collected in a specified manner.

In the relay device according to the embodiment of the present disclosure, the log notification indicates a plurality of the sets. Then, when the plurality of start conditions in any one of the plurality of sets are all satisfied, the processing unit 24 gives a command for log collection.

With this configuration, for example, it is possible to efficiently collect logs classified for each specific vehicle state and each specific vehicle environment, which are required for vehicle development.

It is noted that the above embodiments are merely illustrative in all aspects and should not be recognized as being restrictive. The scope of the present invention is defined by the scope of the claims rather than the above description, and is intended to include meaning equivalent to the scope of the claims and all modifications within the scope.

The above description includes the features in the additional note below.

Additional Note 1

An on-vehicle communication device capable of relaying data between a plurality of function units mounted on a vehicle, the on-vehicle communication device including:

a log notification acquisition unit configured to receive, from an external device outside the vehicle, a log notification indicating a log target function unit which is the function unit that is a target of log collection, a start condition for log collection, and a trigger function unit which is the function unit capable of determination for the start condition;

a notification unit configured to notify the trigger function unit of the start condition indicated by the log notification; and a command unit configured to, in response to a notification that the start condition is satisfied from the trigger function unit, give a command for log collection to the log target function unit, wherein the on-vehicle communication device is a gateway device, the function units are a telematics communication unit (TCU), an autonomous driving electronic control unit (ECU), an engine ECU, a sensor, a navigation device, a human machine interface, and a camera, the log notification indicates a log address which is an address of the log target function unit, the start condition, and a trigger address which is an address of the trigger function unit, the notification unit notifies the trigger function unit of the start condition indicated by the log notification, using the trigger address, and the command unit gives the command to the log target function unit, using the log address, in response to the notification that the start condition is satisfied from the trigger function unit.

REFERENCE SIGNS LIST 1 vehicle
11 external network
12 on-vehicle network
21 acquisition unit
22 notification unit
23 storage unit
24 processing unit (command unit)
51 relay processing unit
52 communication port
101 log collection device
111 on-vehicle ECU
111A TCU
111B temperature sensor
111C intake pressure sensor
111D water temperature sensor
111E engine ECU
151 relay device (on-vehicle communication device)
161 wireless base station device
181 server
201 communication system
301 on-vehicle communication system

The invention claimed is:
1. An on-vehicle communication device for relaying data between a plurality of electronic control units (ECUs) or sensors mounted on a vehicle, the on-vehicle communication device comprising:
a processor programmed to:
receive, from an external device located outside the vehicle, a log notification indicating (i) a log target ECU that collects logs of a measurement result and a control result by one or more of the plurality of ECUs and sensors, (ii) a start condition for log collection, and (iii) a trigger function unit, which is a trigger function ECU or trigger sensor, that determines satisfaction of the start condition;
notify the trigger function unit of the start condition indicated by the log notification; and
transmit a command for log collection to the log target ECU, in response to receiving a notification that the start condition is satisfied from the trigger function unit.

2. The on-vehicle communication device according to claim 1, wherein the log notification indicates a plurality of the start conditions associated with one of the trigger function unit.

3. The on-vehicle communication device according to claim 1, wherein:
the log notification indicates a plurality of the trigger function units and a set of a plurality of the start conditions respectively associated with the plurality of trigger function units, and
the processor is programmed to transmit the command when the plurality of start conditions are all satisfied.

4. The on-vehicle communication device according to claim 3, wherein:
the log notification indicates a plurality of the sets, and
the processor is programmed to transmit the command when the plurality of start conditions in any one of the plurality of sets are all satisfied.

5. The on-vehicle communication device according to claim 1, wherein:
the log target ECU is an engine ECU, and
the measurement result and the control result include information indicating an engine rotation speed and information indicating a brake torque.

6. The on-vehicle communication device according to claim 5, wherein:
the trigger sensor of the trigger function unit is a temperature sensor that regularly measures an ambient temperature of the vehicle, and
the start condition includes that the ambient temperature reaches a predetermined temperature.

7. The on-vehicle communication device according to claim 5, wherein:
the trigger sensor of the trigger function unit is an intake pressure sensor that regularly measures an intake pressure of an engine in the vehicle, and
the start condition includes that the intake pressure reaches a predetermined pressure.

8. The on-vehicle communication device according to claim 5, wherein:
the trigger sensor of the trigger function unit is a water temperature sensor that regularly measures a temperature of cooling water circulating inside an engine in the vehicle, and
the start condition includes that the temperature of cooling water reaches a predetermined temperature.

9. A log collection method in an on-vehicle communication device for relaying data between a plurality of electronic control units (ECUs) or sensors mounted on a vehicle, the log collection method comprising steps of:
receiving, from an external device located outside the vehicle, a log notification indicating (i) a log target ECU that collects logs of a measurement result and a control result by one or more of the plurality of ECUs and sensors, (ii) a start condition for log collection, and (iii) a trigger function unit, which is a trigger ECU or trigger sensor, that determines satisfaction of the start condition;

notifying the trigger function unit of the start condition indicated by the log notification; and transmitting a command for log collection to the log target ECU, in response to receiving a notification that the start condition is satisfied from the trigger function unit.

10. A non-transitory computer readable storage medium storing a log collection program used in an on-vehicle communication device for relaying data between a plurality of electronic control units (ECUs) or sensors mounted on a vehicle, the log collection program, when executed, causing a computer to perform:

receiving, from an external device located outside the vehicle, a log notification indicating (i) a log target ECU that collects logs of a measurement result and a control result by one or more of the plurality of ECUs and sensors, (ii) a start condition for log collection, and (iii) a trigger function unit, which is a trigger ECU or trigger sensor, that determines satisfaction of the start condition;

notifying the trigger function unit of the start condition indicated by the log notification; and transmitting a command for log collection to the log target ECU, in response to receiving a notification that the start condition is satisfied from the trigger function unit.

* * * * *